(12) United States Patent
Jin et al.

(10) Patent No.: US 12,445,212 B2
(45) Date of Patent: Oct. 14, 2025

(54) METHOD AND APPARATUS FOR MEASURING AND REPORTING CROSS-LINK INTERFERENCE IN NEXT-GENERATION MOBILE COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR); Himke Van Der Velde, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/731,962

(22) Filed: Jun. 3, 2024

(65) Prior Publication Data

US 2024/0322920 A1   Sep. 26, 2024

Related U.S. Application Data

(63) Continuation of application No. 17/869,258, filed on Jul. 20, 2022, now Pat. No. 12,003,283, which is a
(Continued)

(30) Foreign Application Priority Data

Jul. 4, 2019 (KR) ........................ 10-2019-0080885

(51) Int. Cl.
*H04B 17/24* (2015.01)
*H04B 17/345* (2015.01)
(Continued)

(52) U.S. Cl.
CPC ........... *H04B 17/24* (2015.01); *H04B 17/345* (2015.01); *H04L 5/0048* (2013.01);
(Continued)

(58) Field of Classification Search
CPC .... H04B 17/24; H04B 17/345; H04B 17/382; H04B 17/327; H04L 27/2602;
(Continued)

(56) References Cited

U.S. PATENT DOCUMENTS 9,326,178 B2   4/2016 Jung et al.
9,572,061 B2   2/2017 Jung et al.
(Continued)

FOREIGN PATENT DOCUMENTS

CN   105813108 A   7/2016
CN   109088683 A   12/2018
(Continued)

OTHER PUBLICATIONS

LG Electronics; "Discussion on CLI measurement";3GPP TSG-RAN WG4 Meeting #91,R4-1906038; Reno, US, May, 13-17, 2019.
Huawei, HiSilicon; "Discussion on RRM requirements for CLI measurement"; 3GPP TSG-RAN WG4 Meeting #91; R4-1906566; Reno, US, May 13-17, 2019.
(Continued)

*Primary Examiner* — Melvin C Marcelo
*Assistant Examiner* — Natali Pascual Peguero
(74) *Attorney, Agent, or Firm* — Jefferson IP Law, LLP

(57) ABSTRACT

A method and apparatus for measuring and reporting cross-link interference are provided. The method includes receiving, from a base station (BS), a measurement configuration for the CLI, performing measurement on the configured measurement object based on the measurement configuration for the CLI and transmitting, to the BS, based on a measurement result of at least one of a resource from a plurality of resources for measuring the CLI of the configured measurement object exceeding a threshold, a measurement report for all of the plurality of resources for measuring the CLI of the configured measurement object whose measurement result exceeds the threshold.

16 Claims, 11 Drawing Sheets

Related U.S. Application Data continuation of application No. 16/921,336, filed on Jul. 6, 2020, now Pat. No. 11,418,988.

(51) Int. Cl.
| | | |
|---|---|---|
| *H04L 5/00* | (2006.01) | |
| *H04L 27/26* | (2006.01) | |
| *H04W 16/18* | (2009.01) | |
| *H04W 24/10* | (2009.01) | |
| *H04W 72/541* | (2023.01) | |

(52) U.S. Cl.
CPC ......... *H04L 27/2602* (2013.01); *H04W 16/18* (2013.01); *H04W 24/10* (2013.01); *H04W 72/541* (2023.01); *H04L 27/261* (2013.01)

(58) Field of Classification Search
CPC ... H04L 5/0048; H04L 5/1469; H04L 27/261; H04W 16/18; H04W 24/08; H04W 24/10; H04W 72/541; H04W 72/542; H04W 16/04
See application file for complete search history.

(56) References Cited

U.S. PATENT DOCUMENTS

| | | | |
|---|---|---|---|
| 9,788,316 B2 | 10/2017 | Seo et al. | |
| 11,418,988 B2 | 8/2022 | Jin et al. | |
| 12,003,283 B2* | 6/2024 | Jin | ........................ H04W 24/08 |
| 2020/0351690 A1* | 11/2020 | Zhu | ........................ H04L 5/0094 |

FOREIGN PATENT DOCUMENTS

| | | |
|---|---|---|
| WO | 2019/032031 A1 | 2/2019 |
| WO | 2019/216668 A1 | 11/2019 |

OTHER PUBLICATIONS

Qualcomm Incorporated;"Discussion on RRM requirements for CLI", 3GPPRAN4#91;R4-1906991; Reno, USA, May 13-17, 2019.
International Search Report and written opinion dated Oct. 15, 2020, issued in International Application No. PCT/ KR2020/008818.
Qualcomm Incorporated: "CLI-RSSI and SRS-RSRP Measurement", 3GPP TSG-RAN WG2 Meeting #106 R2-1906109, Reno, Nevada USA, May 13-17, 2019.
ZTE: "UE-to-UE measurement as an enabler for CLI mitigation schemes", 3GPP TSG RAN WG1 Meeting NR Ad-Hoc#2, R1-1710128, Qingdao, P.R.China, Jun. 27-30, 2017.
Extended European Search Report dated Jun. 14, 2022, issued in European Application No. EP 20834998.5.
Indian Office Action dated Nov. 29, 2023, issued in Indian Application No. 202137054415.
Nokia, Nokia Shanghai Bell, Ue Cli measurement configuration and reporting, R2-1906637 "UE CLI measurement configuration and reporting", 3GPP TSG-RAN2#106, Reno, USA, May 13-17, 2019.
Huawei, HiSilicon, CLI measurements configuration and reporting, R2-1907399 "CLI Measurements configuration and reporting", 3GPP TSG-RAN WG2 #106, Reno, USA, May 13-17, 2019.
Chinese Office Action dated Feb. 23, 2024, issued in Chinese Application No. 202080048568.4.
RAN2, LS on measurement gap for SRS-RSRP or CLI-RSSI measurements, R2-1908371, 3GPP TSG-RAN WG2 Meeting #106, May 18, 2019, Reno, USA.
Chinese Notice of Allowance dated Nov. 8, 2024, issued in Chinese Application No. 202080048568.4.
Korean Office Action dated Apr. 16, 2025, issued in Korean Application No. 10-2019-0080885.
European Office Action dated Apr. 25, 2025, issued in European Application No. 20834998.5.
Indian Hearing Notice dated Jun. 2, 2025, issued in Indian Application No. 202137054415.

* cited by examiner

METHOD AND APPARATUS FOR MEASURING AND REPORTING CROSS-LINK INTERFERENCE IN NEXT-GENERATION MOBILE COMMUNICATION SYSTEM

CROSS-REFERENCE TO RELATED APPLICATION(S)

This application is a continuation application of prior application Ser. No. 17/869,258, filed on Jul. 20, 2022, which issued as U.S. Pat. No. 12,003,283 on Jun. 4, 2024, which is a continuation application of prior application Ser. No. 16/921,336, filed on Jul. 6, 2020, which issued as U.S. Pat. No. 11,418,988 on Aug. 16, 2022, which is based on and claims priority under 35 U.S.C. § 119(a) of a Korean patent application number 10-2019-0080885, filed on Jul. 4, 2019, in the Korean Intellectual Property Office, the disclosure of each of which is incorporated by reference herein in its entirety.

BACKGROUND

1. Field

The disclosure relates to a method and apparatus for measuring and reporting cross-link interference. More particularly, the disclosure relates to a method and apparatus for measuring and reporting cross-link interference in a next-generation mobile communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, the implementation of 5G communication systems in an ultra-high-frequency or millimeter-wave (mmWave) band (e.g., a 60 GHz band) is being considered. To reduce path loss of radio waves and increase a transmission distance of radio waves in the ultra-high-frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multipoints (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructure, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of cloud RAN as the above-described big data processing technology may be an example of convergence of 5G communication technology and IoT technology.

As various services may be provided according to the foregoing and the development of mobile communication systems, methods for effectively providing such services are required. More particularly, in a serving cell configured with time division duplex (TDD), in order to dynamically operate a TDD resource, a method for receiving a report of interference information about a cross link from a terminal and then utilizing the same is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for measuring and reporting a cross link interference in a next-generation mobile communication system.

Additional aspects will be set forth in part in the description which follows and, in part, will be apparent from the description, or may be learned by practice of the presented embodiments.

In accordance with an aspect of the disclosure, a method of measuring and reporting cross link interference (CLI) by a user equipment (UE) in a wireless communication system is provided. The method includes receiving, from a base station (BS), a measurement configuration for the CLI, performing measurement on the configured measurement object based on the measurement configuration for the CLI and transmitting, to the BS, based on a measurement result of at least one resource from a plurality of resources for measuring the CLI of the configured measurement object exceeding a threshold, a measurement report for all the plurality of resources for measuring the CLI of the configured measurement object whose measurement result exceeds the threshold.

The threshold may be a value configured for measuring the CLI and associated with the at least one resource for measuring the CLI.

The performing of the measurement on the configured measurement object based on the measurement configuration for the CLI may include performing, based on a first measurement result of the at least one resource from the plurality of resources for measuring the CLI of the configured measurement object exceeding the threshold and a second measurement result according to a measurement performed thereafter is below the threshold, the measurement on the configured measurement object again.

The first measurement result may be a value obtained by subtracting a hysteresis parameter from the measurement result, and the second measurement result may be a value obtained by adding the hysteresis parameter from the measurement result.

The performing of the measurement for configured measurement object based on the measurement configuration for the CLI may include performing measurement on all of the plurality of resources for measuring the CLI of the configured measurement object.

The measurement configuration for the CLI may include information on the at least one measurement object and information on at least one resource for measuring the CLI for the each of the configured measurement object.

The at least one resource for measuring the CLI may include at least one of a sounding reference signal (SRS) resource configuration or a resource configuration for measuring received signal strength indication (RSSI) for measuring the CLI.

The measurement report may include at least one of a sounding reference signal-reference signal received power (SRS-RSRP) or cross link interference-received signal strength indication (CLI-RSSI).

The transmitting of the measurement report may include transmitting, to the BS, a measurement report of a serving cell of the UE.

The method may further include transmitting, to the BS, the measurement report periodically.

In accordance with another aspect of the disclosure, a user equipment (UE) measuring and reporting cross link interference (CLI) in a wireless communication system is provided. The UE includes a transceiver and at least one processor configured to receive, from a base station (BS), a measurement configuration for the CLI, perform measurement on the configured measurement object based on the measurement configuration for the CLI and control the transceiver to transmit, to the BS, based on a measurement result of at least one of a resource from a plurality of resources for measuring the CLI of the configured measurement object exceeds a threshold, a measurement report for all the resources for measuring the CLI of the configured measurement object whose measurement result exceeds the threshold.

The threshold may be a value configured for measuring the CLI and associated with the at least one resource for measuring the CLI.

The at least one processor may be further configured to perform, based on a first measurement result of the at least one a resource from the plurality of resources for measuring the CLI of the configured measurement object exceeding the threshold and a second measurement result according to a measurement performed thereafter is below the threshold, the measurement on the configured measurement object again.

The first measurement result may be a value obtained by subtracting a hysteresis parameter from the measurement result, and the second measurement result may be a value obtained by adding the hysteresis parameter from the measurement result.

The at least one processor is further configured to perform measurement on all of the plurality of resources for measuring the CLI of the configured measurement object.

The measurement configuration for the CLI may include information on the at least one measurement object and information on at least one resource for measuring the CLI for the each of the configured measurement object.

The at least one resource from the plurality of resources for measuring the CLI may include at least one of a sounding reference signal (SRS) resource configuration or a resource configuration for measuring received signal strength indication (RSSI) for measuring the CLI.

The measurement report may include at least one of a sounding reference signal-reference signal received power (SRS-RSRP) or cross link interference-received signal strength indication (CLI-RSSI).

The at least one processor may be further configured to control the transceiver to transmit, to the BS, a measurement report of a serving cell of the UE.

The at least one processor may be further configured to control the transceiver to transmit, to the BS, the measurement report periodically.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
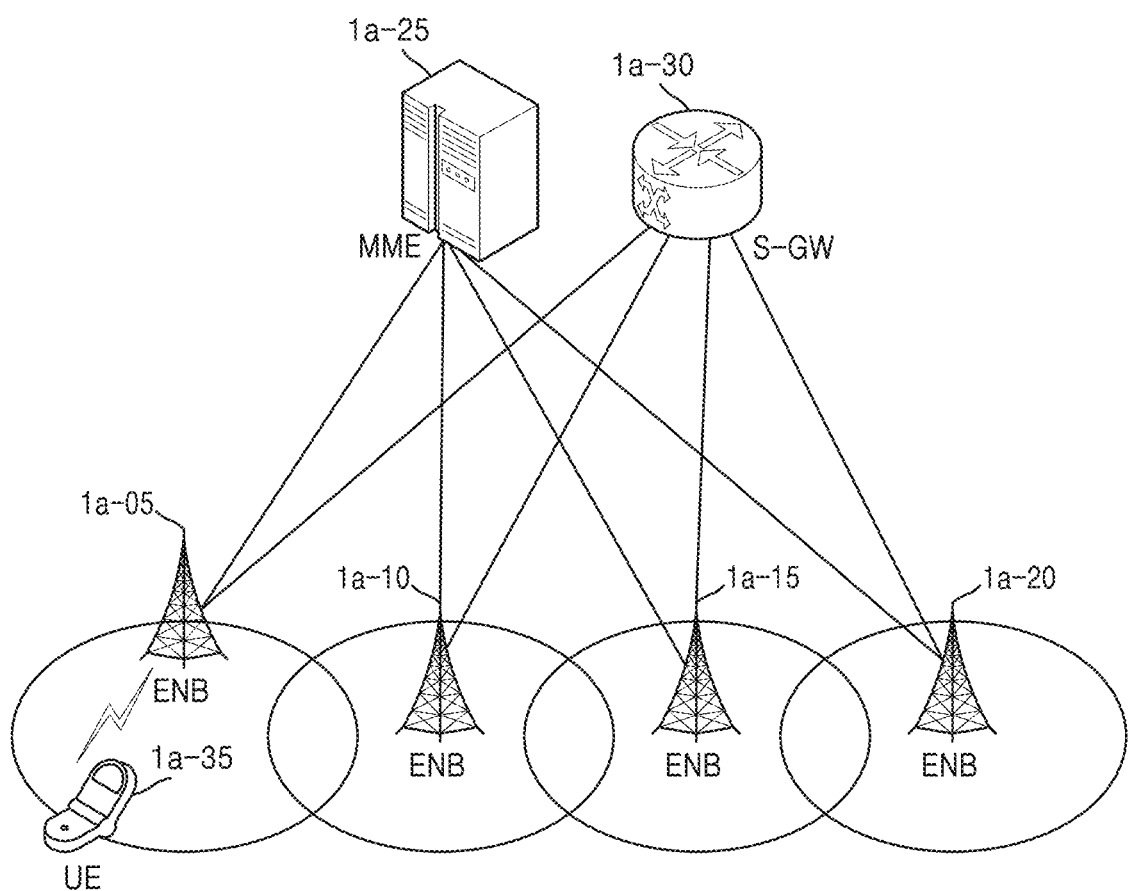
FIG. 1 is a diagram illustrating a structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, descriptions of technical contents that are well known in the technical field to which the disclosure belongs and are not directly related to the disclosure will be omitted. This is to more clearly convey the subject matter of the disclosure without obscuration thereof by omitting unnecessary descriptions thereof.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

The advantages and features of the disclosure and the accomplishing methods thereof will become apparent from the embodiments of the disclosure described below in detail with reference to the accompanying drawings. The disclosure may, however, be embodied in many different forms and should not be construed as being limited to the embodiments of the disclosure described below; rather, these embodiments of the disclosure are provided to complete the disclosure and fully convey the scope of the disclosure to those of ordinary skill in the art and the disclosure will be defined only by the scope of the claims. Throughout the specification, like reference numerals may denote like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

Also, the term "unit" used herein means a software component or a hardware component such as a field-programmable gate array (FPGA) or an application-specific integrated circuit (ASIC), and the "unit" performs some functions. However, the "~ unit" is not limited to software or hardware. The "~ unit" may be configured to be in an addressable storage medium or may be configured to operate one or more processors. Thus, as an example, the "~ unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~ units" may be associated with the smaller number of components and "~ units" or may be further divided into additional components and "~ units". In addition, the components and "~ units" may be implemented to operate one or more central processing units (CPUs) in a device or a security multimedia card. Also, in embodiments, the "~ unit" may include one or more processors.

In the following description, terms for identifying access nodes, terms referring to network entities, terms referring to messages, terms referring to interfaces between network entities, terms referring to various identification information, and the like are used for convenience of description. Thus, the disclosure is not limited to the terms used below and other terms referring to objects having equivalent technical meanings may be used.

In the following description, terms and names defined in the 3$^{rd}$ generation partnership project long term evolution (3GPP LTE) and New Radio (NR) standards or modified terms and names based thereon may be used for convenience of description. However, the disclosure is not limited to those terms and names and is equally applicable to systems according to other standards.

That is, in particularly describing the embodiments of the disclosure, the communication standards defined in 3GPP will be mainly targeted; however, the subject matter of the disclosure may also be applied to other communication systems having similar technical backgrounds with some modifications without materially departing from the scope of the disclosure, which may be possible by the judgment of those of ordinary skill in the technical field of the disclosure.

The disclosure relates to a method of receiving a report of interference information about a cross link from a terminal in order to dynamically operate a time division duplex (TDD) resource in a serving cell configured with TDD. For this purpose, a series of operations of a terminal measuring and reporting uplink interference information transmitted by another terminal in a surrounding cell (or a cross link) may be required. The interference information may include SRS-RSRP and CLI-RSSI. Measuring and reporting of a reference signal in an NR system may be performed based on a downlink reference signal, which may be a signal transmitted by a base station. However, a new process of a terminal measuring and reporting a signal transmitted by another terminal may be required.

According to an embodiment of the disclosure, by providing a process of measuring uplink signals, for example, SRS-RSRP and CLI-RSSI, transmitted by another terminal in a next-generation mobile communication system and reporting the corresponding measurement values to a base station, the base station may configure dynamic TDD based on the reported measurement values. For example, when the interference in a surrounding cell is strong, the base station may restrict TDD uplink allocation to the terminal, thereby improving data quality.

FIG. 1 is a diagram illustrating a structure of an LTE system according to an embodiment of the disclosure.

Referring to FIG. 1, as illustrated, a radio access network of the LTE system may include a plurality of base stations (e.g., evolved Node Bs (eNBs), Node Bs, or base stations) 1*a*-05, 1*a*-10, 1*a*-15, and 1*a*-20, a mobility management entity (MME) 1*a*-25, and a serving-gateway (S-GW) 1*a*-30. A user terminal (e.g., a user equipment (UE) or a terminal) 1*a*-35 may access an external network through the eNBs 1*a*-05, 1*a*-10, 1*a*-15, and 1*a*-20 and the S-GW 1*a*-30.

The base stations (e.g., evolved Node Bs (eNBs), Node Bs, or base stations) 1*a*-05, 1*a*-10, 1*a*-15, and 1*a*-20 may provide wireless access to terminals accessing the network as access nodes of the cellular network. That is, in order to service traffic of users, by collecting and scheduling state information such as buffer states of terminals, available transmission power states, and/or channel states, the base stations 1*a*-05, 1*a*-10, 1*a*-15, and 1*a*-20 may support the connection between terminals and a core network (CN).

Also, the base stations 1*a*-05, 1*a*-10, 1*a*-15, and 1*a*-20 may correspond to the existing Node Bs of the Universal Mobile Telecommunications System (UMTS). The eNB 1*a*-05 may be connected to the UE 1*a*-35 through a wireless channel and may perform a more complex function than the existing Node B. In the LTE system, because all user traffic including real-time services such as Voice over IP (VoIP) through the Internet protocol is serviced through a shared channel, an apparatus for collecting and scheduling state information such as UEs' buffer states, available transmission power states, or channel states may be required, which may be managed by the eNBs 1*a*-05, 1*a*-10, 1*a*-15, and 1*a*-20. One eNB may generally control a plurality of cells. The LTE system may use orthogonal frequency division multiplexing (OFDM) as a radio access technology. Also, an adaptive modulation & coding (AMC) scheme may be applied to determine a modulation scheme and a channel coding rate according to the channel state of a terminal.

The MME 1*a*-25 may be an apparatus for managing various control functions as well as a mobility management function for a terminal and may be connected to a plurality of base stations. The S-GW 1*a*-30 may be an apparatus that provides a data bearer. The MME 1*a*-25 and the S-GW 1*a*-30 may perform authentication, bearer management, or the like for the terminal accessing the network and may process packets received from the base stations 1*a*-05, 1*a*-10, 1*a*-15, and 1*a*-20 or packets to be transmitted to the base stations 1*a*-05, 1*a*-10, 1*a*-15, and 1*a*-20.

Figure 2:
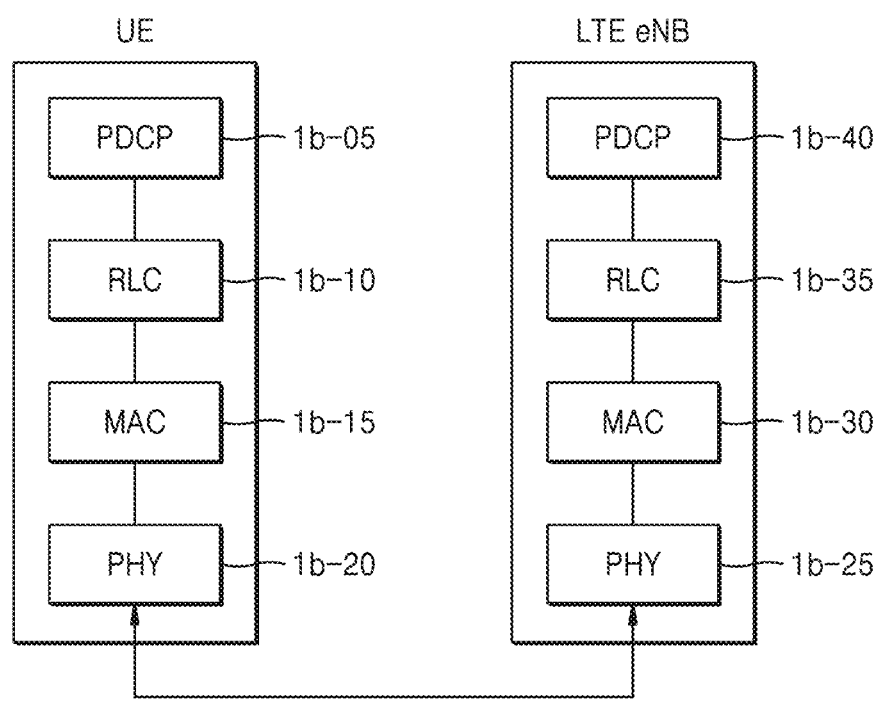
FIG. 2 is a diagram illustrating a radio protocol architecture in an LTE system according to an embodiment of the disclosure.

FIG. 2 is a diagram illustrating a radio protocol architecture in an LTE system according to an embodiment of the disclosure.

Referring to FIG. 2, the radio protocol of the LTE system may include Packet Data Convergence Protocol (PDCP) 1*b*-05 and 1*b*-40, Radio Link Control (RLC) 1*b*-10 and 1*b*-35, and Medium Access Control (MAC) 1*b*-15 and 1*b*-30 in a terminal and an eNB, respectively. The PDCP 1*b*-05 and 1*b*-40 may manage operations such as IP header compression/decompression. The main functions of the PDCP may be summarized as follows.

Header compression and decompression function (Header compression and decompression: ROHC only)
  User data transmission function (Transfer of user data)
  Sequential transmission function (In-sequence delivery of upper layer PDUs at PDCP re-establishment procedure for RLC AM)
  Reordering function (For split bearers in DC (only support for RLC AM): PDCP PDU routing for transmission and PDCP PDU reordering for reception)
  Duplicate detection function (Duplicate detection of lower layer SDUs at PDCP re-establishment procedure for RLC AM)
  Retransmission function (Retransmission of PDCP SDUs at handover and, for split bearers in DC, of PDCP PDUs at PDCP data-recovery procedure, for RLC AM)
  Ciphering and deciphering function (Ciphering and deciphering)
  Timer-based SDU discard function (Timer-based SDU discard in uplink))

The radio link control (RLC) 1*b*-10 and 1*b*-35 may reconfigure a PDCP packet data unit (PDU) in a suitable size to perform an ARQ operation or the like. The main functions of the RLC may be summarized as follows.

Data transmission function (Transfer of upper layer PDUs)

ARQ function (Error Correction through ARQ (only for AM data transfer))

Concatenation, segmentation, and reassembly function (Concatenation, segmentation, and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer))

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MAC 1b-15 and 1b-30 may be connected to multiple RLC layers configured in one terminal and may perform an operation of multiplexing RLC PDUs into MAC PDUs and demultiplexing RLC PDUs from MAC PDUs. The main functions of the MAC may be summarized as follows.

Mapping function (Mapping between logical channels and transport channels)

Multiplexing and demultiplexing function (Multiplexing/demultiplexing of MAC SDUs belonging to one or different logical channels into/from transport blocks (TB) delivered to/from the physical layer on transport channels)

Scheduling information report function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 1b-20 and 1b-25 may channel-code and modulate upper layer data, generate OFDM symbols, and transmit the same on wireless channels or may demodulate and channel-decode OFDM symbols received on wireless channels and transmit the result thereof to the upper layer.

Although not illustrated in FIG. 2, a radio resource control (RRC) layer may exist above the PDCP layer of the terminal and the base station, and the RRC layer may transmit/receive connection and measurement-related configuration control messages for radio resource control.

Figure 3:
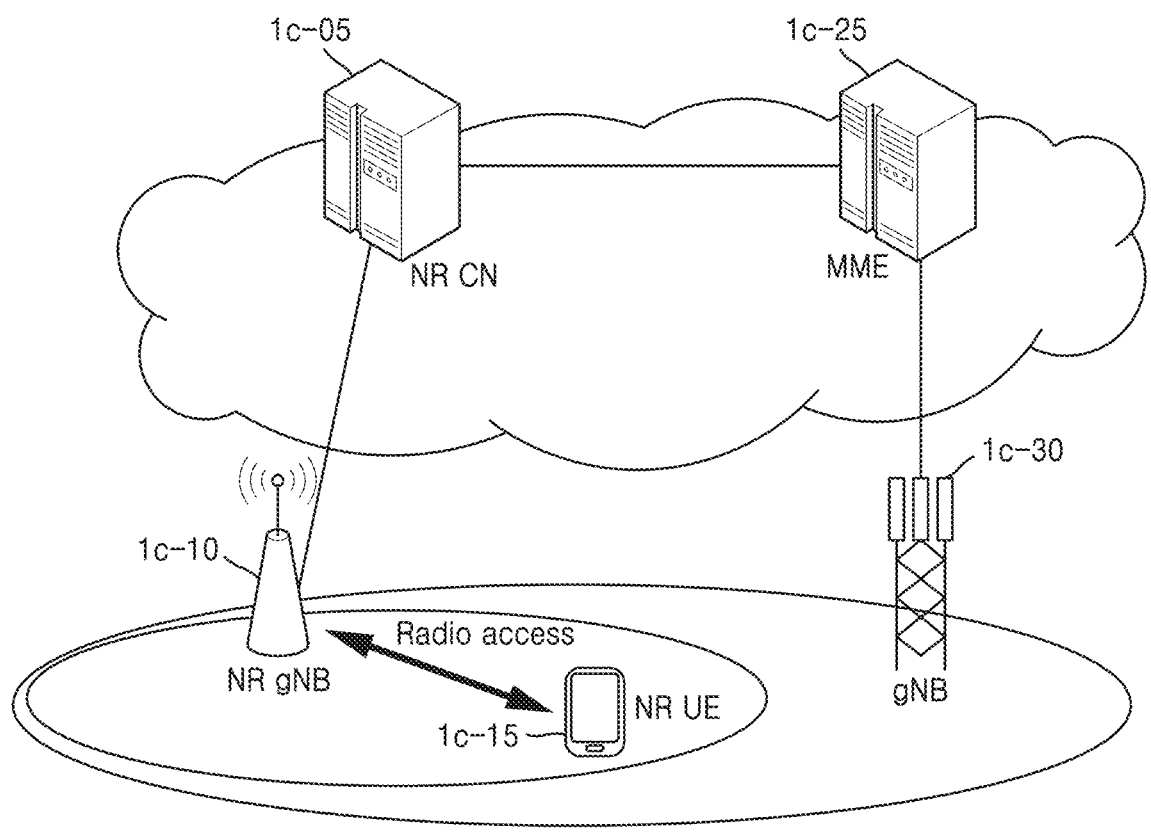
FIG. 3 is a diagram illustrating a structure of a next-generation mobile communication system according to an embodiment of the disclosure.

FIG. 3 is a diagram illustrating a structure of a next-generation mobile communication system according to an embodiment of the disclosure.

Referring to FIG. 3, a radio access network of the next-generation mobile communication system (5G or NR system) may include a next-generation base station (e.g., a new radio Node B (NR NB), an NR gNB, or an NR base station) 1c-10 and a new radio core network (NR CN) (or a next-generation core network (NG CN)) 1c-05. A user terminal (e.g., a new radio user equipment (NR UE) or a terminal) 1c-15 may access an external network through the NR gNB 1c-10 and the NR CN 1c-05.

In FIG. 3, the NR gNB 1c-10 may correspond to an evolved Node B (eNB) of the LTE system. The NR gNB 1c-10 may be connected to the NR UE 1c-15 through a wireless channel and may provide a better service than the existing Node B. In the next-generation mobile communication system, because all user traffic is serviced through a shared channel, an apparatus for collecting and scheduling state information such as UEs' buffer states, available transmission power states, or channel states may be required, which may be managed by the NR gNB 1c-10. One NR gNB 1c-10 may generally control a plurality of cells and may include a central unit (CU) generally managing control and signaling and a distributed unit (DU) managing transmission/reception of signals. In order to implement ultra-high-speed data transmission in comparison with the LTE, the next-generation mobile communication system (5G or NR system) may have a maximum bandwidth above an existing maximum bandwidth and may additionally apply a beamforming technology by using orthogonal frequency division multiplexing (OFDM) as a radio access technology. Also, an adaptive modulation & coding (AMC) scheme may be applied to determine a modulation scheme and a channel coding rate according to the channel state of a terminal. The NR CN 1c-05 may perform functions such as mobility support, bearer configuration, and Quality of Service (QoS) configuration. The NR CN 1c-05 may be an apparatus for managing various control functions as well as a mobility management function for a terminal and may be connected to a plurality of base stations. Also, the next-generation mobile communication system (5G or NR system) may also be linked with the LTE system, and the NR CN 1c-05 may be connected to an MME 1c-25 through a network interface. The MME 1c-25 may be connected to an eNB 1c-30 that is an existing base station.

Figure 4:
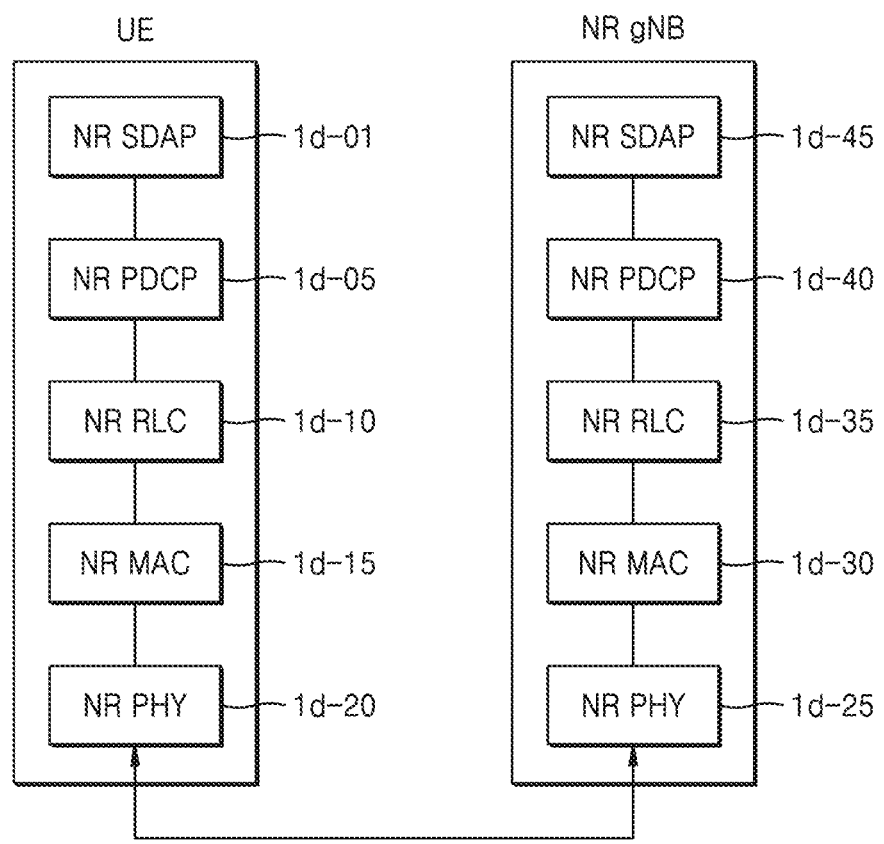
FIG. 4 is a diagram illustrating a radio protocol architecture of a next-generation mobile communication system according to an embodiment of the disclosure.

FIG. 4 is a diagram illustrating a radio protocol architecture of a next-generation mobile communication system according to an embodiment of the disclosure.

Referring to FIG. 4, the radio protocol of the next-generation mobile communication system (5G or NR system) may include NR Service Data Adaptation Protocol (SDAP) 1d-01 and 1d-45, NR PDCP 1d-05 and 1d-40, NR RLC 1d-10 and 1d-35, and NR MAC 1d-15 and 1d-30 in a terminal and an NR base station, respectively.

The main functions of the NR SDAP 1d-01 and 1d-45 may include some of the following functions.

User data transmission function (Transfer of user plane data)

Function of mapping between QoS flow and data bearer for uplink and downlink (Mapping between a QoS flow and a DRB for both DL and UL)

Function of marking QoS flow ID for uplink and downlink (Marking QoS flow ID in both DL and UL packets)

Function of mapping reflective QoS flow to data bearer for uplink SDAP PDUs (Reflective QoS flow to DRB mapping for the UL SDAP PDUs)

For the SDAP layer, the terminal may be configured with an RRC message whether to use a header of the SDAP layer or whether to use a function of the SDAP layer for each PDCP layer, for each bearer, or for each logical channel. When an SDAP header is configured, a non-access stratum (NAS) QoS reflective configuration 1-bit indicator (NAS reflective QoS) and an access stratum (AS) QoS reflective configuration 1-bit indicator (AS reflective QoS) of the SDAP header may be used to indicate to allow the terminal to update or reconfigure a QoS flow of an uplink and a downlink and mapping information about a data bearer. The SDAP header may include QoS flow ID information representing the QoS. The QoS information may be used as data processing priority and scheduling information or the like to support a smooth service.

The main functions of the NR PDCP $1d$-05 and $1d$-40 may include some of the following functions.

Header compression and decompression function (Header compression and decompression: ROHC only)
    User data transmission function (Transfer of user data)
    Sequential transmission function (In-sequence delivery of upper layer PDUs)
    Non-sequential transmission function (Out-of-sequence delivery of upper layer PDUs)
    Reordering function (PDCP PDU reordering for reception)
    Duplicate detection function (Duplicate detection of lower layer SDUs)
    Retransmission function (Retransmission of PDCP SDUs)
    Ciphering and deciphering function (Ciphering and deciphering)
        Timer-based SDU discard function (Timer-based SDU discard in uplink))

Here, the reordering function of the NR PDCP entity may refer to a function of reordering the PDCP PDUs received from the lower layer based on the PDCP sequence number (SN), may include a function of transmitting data to the upper layer in the reordered sequence or immediately without considering the sequence, may include a function of reordering the sequence and recording lost PDCP PDUs, may include a function of reporting the state of lost PDCP PDUs to the transmitting side, and may include a function of requesting retransmission of lost PDCP PDUs.

The main functions of the NR RLC $1d$-10 and $1d$-35 may include some of the following functions.

Data transmission function (Transfer of upper layer PDUs)
    Sequential transmission function (In-sequence delivery of upper layer PDUs)
    Non-sequential transmission function (Out-of-sequence delivery of upper layer PDUs)
    ARQ function (Error correction through ARQ)
    Concatenation, segmentation, and reassembly function (Concatenation, segmentation, and reassembly of RLC SDUs)
    Re-segmentation function (Re-segmentation of RLC data PDUs)
    Reordering function (Reordering of RLC data PDUs)
    Duplicate detection function (Duplicate detection)
    Error detection function (Protocol error detection)
    RLC SDU discard function (RLC SDU discard)
    RLC re-establishment function (RLC re-establishment)

Here, the sequential transmission (in-sequence delivery) function of the NR RLC entity may mean a function of sequentially transmitting the RLC SDUs received from the lower layer to the upper layer. More particularly, when one original RLC SDU is segmented into multiple RLC SDUs and received, the above function may include a function of reassembling and transmitting the received RLC SDUs, a function of reordering the received RLC PDUs based on the RLC sequence number (SN) or the PDCP sequence number (SN), a function of reordering the sequence and recording lost RLC PDUs, a function of reporting the state of lost RLC PDUs to the transmitting side, a function of requesting retransmission of lost RLC PDUs, a function of, when there is a lost RLC SDU, sequentially transmitting only the RLC SDUs before the lost RLC SDU to the upper layer, a function of, when a certain timer has expired even when there is a lost RLC SDU, sequentially transmitting all the RLC SDUs received before the start of the timer to the upper layer, and a function of, when a certain timer has expired even when there is a lost RLC SDU, sequentially transmitting all the RLC SDUs received until now to the upper layer.

In this case, the RLC PDUs may be processed in order of reception (in order of arrival regardless of the order of sequence numbers) and then transmitted to the PDCP entity regardless of the sequence (out-of-sequence delivery), and in the case of segments, the segments stored in the buffer or to be received later may be received, reconfigured into one complete RLC PDU, and then processed and transmitted to the PDCP entity. The NR RLC layer may not include the concatenation function, and this function may be performed in the NR MAC layer or may be replaced with the multiplexing function of the NR MAC layer.

Here, the non-sequential transmission function (out-of-sequence delivery) of the NR RLC entity may refer to a function of immediately transmitting RLC SDUs received from the lower layer to the upper layer regardless of the sequence, may include a function of, when one original RLC SDU is segmented into multiple RLC SDUs and received, reassembling and transmitting the same, and may include a function of storing the RLC SN or PDCP SN of received RLC PDUs, ordering the sequence, and recording lost RLC PDUs.

The NR MAC $1d$-15 and $1d$-30 may be connected to multiple NR RLC layers configured in one terminal, and the main functions of the NR MAC may include some of the following functions.

Mapping function (Mapping between logical channels and transport channels)
        Multiplexing and demultiplexing function (Multiplexing/demultiplexing of MAC SDUs)
    Scheduling information report function (Scheduling information reporting)
    HARQ function (Error correction through HARQ)
    Priority handling function between logical channels (Priority handling between logical channels of one UE)
    Priority handling function between terminals (Priority handling between UEs by means of dynamic scheduling)
    MBMS service identification function (MBMS service identification)
    Transport format selection function (Transport format selection)
    Padding function (Padding)

NR PHY layers $1d$-20 and $1d$-25 may channel-code and modulate upper layer data, generate OFDM symbols, and transmit the same on wireless channels or may demodulate and channel-decode OFDM symbols received on wireless channels and transmit the results thereof to the upper layer.

Figure 5:
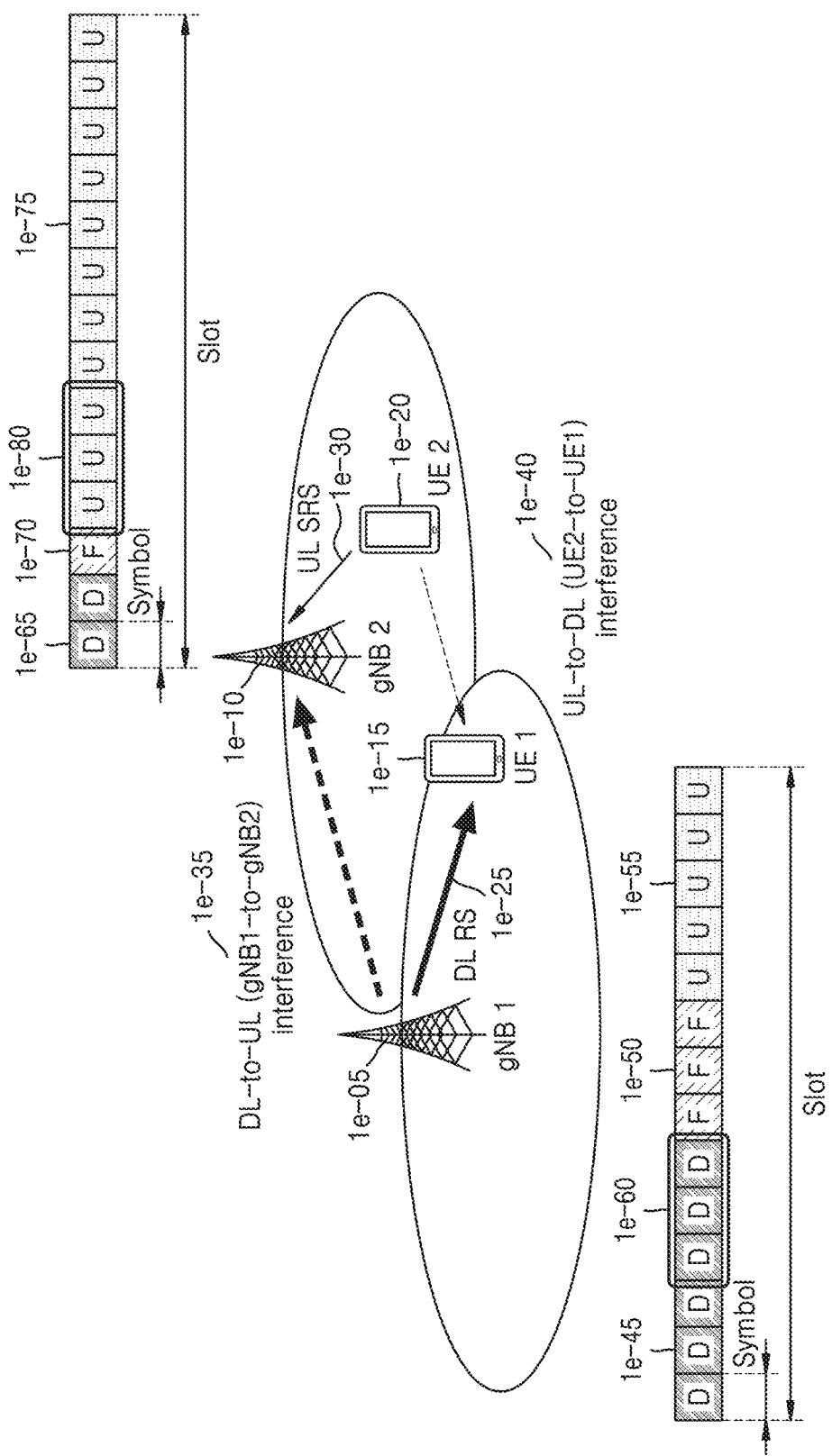
FIG. 5 is a diagram for describing cross-link interference when time division duplex (TDD) cells are configured in a next-generation mobile communication according to an embodiment of the disclosure.

FIG. 5 is a diagram for describing a cross link interference when TDD cells are configured in a next-generation mobile communication system according to an embodiment of the disclosure.

Referring to FIG. 5, illustrated is the influence of a cross link interference (CLI) in operating dynamic TDD scheduling/configuration in the LTE and NR systems that may be applied to the entire disclosure. The disclosure may be applied to such a scenario. Also, from the viewpoint of a base station, remote interference management (RIM) for a terminal may be performed by receiving and applying a measurement value for a cross link interference. For example, this may be achieved by applying dynamic TDD scheduling.

Referring to FIG. 5, there may be a mobile communication network including TDD cells there around. For example, as illustrated in FIG. 5, when a gNB 1 (or a base station 1) 1e-05 supports TDD in a serving cell to which a terminal 1 1e-15 is connected, a gNB 2 (or a base station 2) 1e-10 may also support TDD in a surrounding cell. In this case, there may be a terminal 2 1e-20 connected to the gNB 2 1e-10 to receive a service. Also, a data transmission and a downlink reference signal 1e-25 transmitted from the base station 1 1e-05 to the terminal 1 1e-15 may be measured as an uplink interference 1e-35 for the base station 2 1e-10. Also, a data transmission or an uplink sounding reference signal (SRS) transmission 1e-30 from the terminal 2 1e-20 to the base station 2 1e-10 as a serving cell of the terminal 2 1e-20 may be received as a cross link interference 1e-40 by a terminal receiving a service from another serving cell (the base station 1 1e-05) like the terminal 1 1e-15. Here, an SRS received signal received power (SRS-RSRP) (an RSRP value for the SRS resource measured by the terminal belonging to the current serving cell for the SRS resource transmitted by the terminal belonging to the surrounding cell), a CLI received signal strength indicator (CLI-RSSI) (a signal strength measured by the terminal belonging to the current serving cell for all signals transmitted by the terminal belonging to the surrounding cell), or the like may be used as a measurement value of the cross link interference. According to an embodiment of the disclosure, cross link interference information 1e-40 between terminals may be considered in measuring a cross link interference.

A method of configuring uplink and downlink symbols in the NR TDD system may be different from that in the LTE system and may be summarized as follows.
1) Cell-specific configuration: Uplink or downlink flexible symbol allocation through system information or common RRC signal
2) UE-specific configuration: Allocation of resource allocated as flexible symbol, as uplink or downlink symbol through dedicated RRC message
3) Configuration through group common indication: Change flexible symbol through group-common PDCCH, that is, slot format indicator (SFI)
4) UE-specific indication: Change flexible symbol through UE-specific PDCCH, that is, downlink control indicator (DCI)

That is, in the NR TDD system, a symbol for basic uplink transmission/flexible transmission/downlink transmission supported by a cell may be allocated for each particular slot, and a symbol allocated for flexible transmission for each terminal may be changed to another transmission method. In this case, the symbol for flexible transmission may mean a flexible symbol that may be indicated as a symbol for uplink and downlink transmission by base station configuration. When the corresponding flexible symbol is not changed for another transmission, both uplink and downlink transmission may not occur in the corresponding symbol.

Referring to FIG. 5, a TDD pattern 1 (1e-45, 1e-50, 1e-55) may be configured in a cell supported by the base station 1 1e-05. That is, 6 symbols 1e-45 for downlink transmission, 3 symbols 1e-50 for flexible transmission, and 5 symbols 1e-55 for uplink transmission may be sequentially configured in a slot including a total of 14 symbols. Also, a TDD pattern 2 (1e-65, 1e-70, 1e-75) may be configured in a cell supported by the base station 2 1e-10. That is, 2 symbols 1e-65 for downlink transmission, 1 symbol 1e-70 for flexible transmission, and 11 symbols 1e-75 for uplink transmission may be sequentially configured in a slot including a total of 14 symbols. In this situation, the terminal 1 1e-15 and the terminal 2 1e-20 respectively belonging to the base station 1 1e-05 and the base station 2 1e-10 may perform data transmission/reception and reference signal transmission/reception according to the TDD resource information configured in the respective serving cells thereof. A particular downlink section 1e-60 configured in the terminal 1 1e-15 may overlap a particular uplink section 1e-80 of the surrounding cell, and the terminal 1 1e-15 located at a cell edge may be affected by the interference in the surrounding cell. That is, a cross link interference may be received from the terminal 2 1e-20 in the downlink section 1e-60, which may cause the degradation of communication performance. More particularly, an interference signal may affect a downlink signal to be originally received, to increase the probability of failure in reception and decoding to reduce a data transmission/reception rate.

In relation to the above-described problem, when the terminal measures the SRS-RSRP and the CLI-RSSI for the section (1e-60, 1e-80), in which the base station instructs the terminal to measure a cross link interference, and reports the measurement values to the base station, the base station may determine the degree of a cross link interference of the terminal in the corresponding section. Based on this, the base station may adjust the scheduling for resource allocation and may adjust the uplink/downlink transmission slot and symbol of the terminal through dynamic TDD configuration.

The entire scenario described with reference to FIG. 5 is not limited only to the scenario between TDD cells and may also be applied to a situation in which TDD cells and FDD cells are mixed or to a mobile communication network including only FDD cells.

Figure 6:
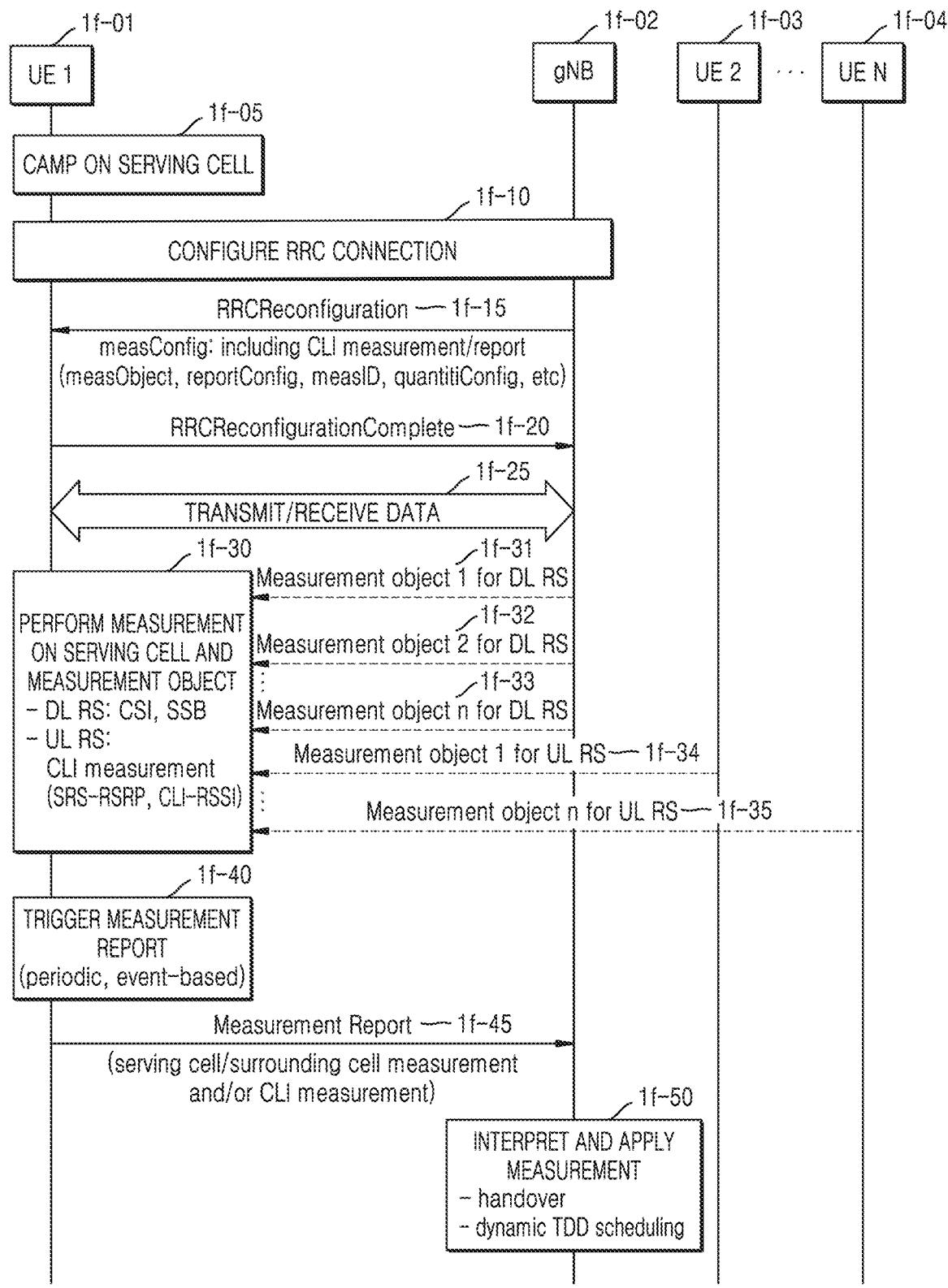
FIG. 6 is a diagram illustrating a process in which a terminal receives a measurement configuration including cross-link interference from a base station and transmits a measurement report thereon in a new radio (NR) system according to an embodiment of the disclosure.

FIG. 6 is a diagram illustrating a process in which a terminal receives a measurement configuration including a cross link interference from a base station and transmits a measurement report thereon in an NR system according to an embodiment of the disclosure.

A terminal 1 1f-01 in an idle mode RRC_IDLE may find a suitable cell in a cell (re)selection operation and camp on a corresponding base station 1f-02 (1f-05) and may perform an RRC connection with the base station 1f-02 due to the occurrence of data to be transmitted, or the like (1f-10). The idle mode may be a state in which data may not be transmitted because the terminal is not connected to the network for power saving or the like, and a transition to a connection mode RRC_CONNECTED may be required for data transmission. Also, camping may mean that the terminal stays in the corresponding cell and receives a paging message to determine whether data is received in the downlink. When the terminal 1 1f-01 succeeds in the RRC connection process with the base station 1f-02, the terminal 1 1f-01 may transition to the connection mode RRC_CONNECTED and the terminal 1 1f-01 in the RRC connection mode may transmit/receive data to/from the base station 1f-02.

The terminal in the connection mode RRC_CONNECTED may be instructed to transmit/receive data through a newly connected cell/base station after a handover from another cell/base station as it moves into or out the cell. For this purpose, the base station may provide a configuration indicating measurement (L3 measurement: downlink reference signal such as CSI-RS or SSB) for another frequency/cell through an RRC message (1f-15). The measurement indication may include an object, a condition, a parameter, or the like for the terminal to report the measurement result to the base station. In addition, an embodiment of the disclosure may be characterized by an operation of configuring and performing the measurement and report of the cross link interference described in FIG. 5 as well as the report through the measurement of the existing downlink reference signal. In operation 1f-15, the base station may provide measurement configuration information (measConfig) to the terminal, and the configuration information may include CLI measurement and report-related configuration information in addition to the existing downlink reference signal measurement configuration and report. Also, the measurement configuration information (measConfig) may include a measurement object configuration (measObject), a report configuration (reportConfig), a measurement identifier configuration (measID) in which a measurement object and a report method are associated, a configuration (quantityConfig) indicating the type of a value to be measured, and/or the like. A measConfig signaling for reference is written in ASN.1 below.

1. Measurement Object Configuration

First, as for measurement object (MO) configuration, there may be a method of reusing measObjectNR used for measurement configuration in a current NR (first MO configuration method) and a method of using new measObject (e.g., measObject-CLI) for CLI measurement (second MO configuration method).

In the first MO configuration method, resource configuration information for measurement of an existing downlink reference signal (CSI-RS or SSB) may be provided. For example, there may be frequency information for the measurement, sub-carrier spacing (SCS) information, SS/PBCH block Measurement Timing Configuration (SMTC) configuration, configuration information for beam measurement, reference signal type information, black cell/white cell list, and/or the like. When the measObjectNR described above is used as is in the CLI measurement configuration, both of two conditions may be necessary.

Configuration information that is not necessary for CLI-specific (measurement) configuration among the exist-

```
MeasConfig ::=                      SEQUENCE {
    measObjectToRemoveList          MeasObjectToRemoveList          OPTIONAL,   -- Need N
    measObjectToAddModList          MeasObjectToAddModList          OPTIONAL,   -- Need N
    reportConfigToRemoveList        ReportConfigToRemoveList        OPTIONAL,   -- Need N
    reportConfigToAddModList        ReportConfigToAddModList        OPTIONAL,   -- Need N
    measIdToRemoveList              MeasIdToRemoveList              OPTIONAL,   -- Need N
    measIdToAddModList              MeasIdToAddModList              OPTIONAL,   -- Need N
    s-MeasureConfig                 CHOICE {
        ssb-RSRP                        RSRP-Range,
        csi-RSRP                        RSRP-Range
    }                                                               OPTIONAL,   -- Need M
    quantityConfig                  QuantityConfig                  OPTIONAL,   -- Need M
    measGapConfig                   MeasGapConfig                   OPTIONAL,   -- Need M
    measGapSharingConfig            MeasGapSharingConfig            OPTIONAL,   -- Need M
    ...
}
```

Hereinafter, configuration information about a cross link interference will be described in more detail. See MO-related ASN.1 below.

ing configuration information (parameter) included in the measObjectNR may be omitted (because all the field (parameter) configuration included in the

```
MeasObjectNR ::=                    SEQUENCE {
    ssbFrequency                        ARFCN-ValueNR                                       OPTIONAL,   -- Cond SSBorAssociatedSSB
    ssbSubcarrierSpacing                SubcarrierSpacing                                   OPTIONAL,   -- Cond SSBorAssociatedSSB
    smtc1                               SSB-MTC                                             OPTIONAL,   -- Cond SSBorAssociatedSSB
    smtc2                               SSB-MTC2                                            OPTIONAL,   -- Cond IntraFreqConnected
    refFreqCSI-RS                       ARFCN-ValueNR                                       OPTIONAL,   -- Cond CSI-RS
    referenceSignalConfig               ReferenceSignalConfig,
    absThreshSS-BlocksConsolidation     ThresholdNR                                         OPTIONAL,   -- Need R
    absThreshCSI-RS-Consolidation       ThresholdNR                                         OPTIONAL,   -- Need R
    nrofSS-BlocksToAverage              INTEGER (2..maxNrofSS-BlocksToAverage)              OPTIONAL,   -- Need R
    nrofCSI-RS-ResourcesToAverage       INTEGER (2..maxNrofCSI-RS-ResourcesToAverage)       OPTIONAL,   -- Need R
    quantityConfigIndex                 INTEGER (1..maxNrofQuantityConfig),
    offsetMO                            Q-OffsetRangeList,
    cellsToRemoveList                   PCI-List                                            OPTIONAL,   -- Need N
    cellsToAddModList                   CellsToAddModList                                   OPTIONAL,   -- Need N
    blackCellsToRemoveList              PCI-RangeIndexList                                  OPTIONAL,   -- Need N
    blackCellsToAddModList              SEQUENCE (SIZE (1..maxNrofPCI-Ranges) OF            OPTIONAL,   -- Need N
                                            PCI-RangeElement
    whiteCellsToRemoveList              PCI-RangeIndexList                                  OPTIONAL,   -- Need N
    whiteCellsToAddModList              SEQUENCE (SIZE (1..maxNrofPCI-Ranges)) OF           OPTIONAL,   -- Need N
                                            PCI-RangeElement
    ... ,
    [[
    freqBandIndicatorNR-v1530           FreqBandIndicatorNR                                 OPTIONAL,   -- Need R
    measCycleSCell-v1530                ENUMERATED {sf160, sf256, sf320, sf512,             OPTIONAL    -- Need R
                                            sf640, sf1024, sf1280}
    ]]
}
``` measObjectNR is OPTIONAL, in the case of the configuration for CLI measurement, it may be omitted by adding a condition)

Field (parameter) configuration for CLI measurement may be added to the measObjectNR, and from the viewpoint of ASN.1, a new parameter may be added as an extension in the existing configuration. The new configuration information may include SRS resource configuration or the like.

Also, the CLI measurement may be the measurement in the downlink resource of the serving cell, which may mean measuring an interference colliding with the downlink resource of the serving cell. For this purpose, the resource of a particular time-frequency domain in an activated downlink bandwidth part (BWP) should be allocated for CLI measurement. In other words, this may mean that only an SCS resource such as an activated downlink BWP may be measured. As a configuration condition for this, a condition that the measObjectNR in which CLI measurement is configured should always be associated with the serving cell may be required. See a field description below.

add a parameter for CLI measurement-related configuration. The disclosure describes a method of adding a CLI measurement parameter through the following two methods.

First CLI measurement parameter configuration method: Resource (e.g., SRS resource) configuration information for CLI measurement may be directly added in the MO. This may be a method of explicitly representing information additional required for SRS resource configuration by extending the corresponding information element (IE) in the case of using the existing measObjectNR. The SRS resource configuration may include the number of ports through which the SRS is transmitted, frequency domain resource information and frequency hopping, the transmission method (periodic, semi-periodic, or aperiodic) of the SRS resource, and/or the like. This may include information about how the SRS resource to be measured is transmitted on which time-frequency resource.

Second CLI measurement parameter configuration method: A method of indicating configuration information (e.g., SRS resource) for CLI measurement configservingCellMO
measObjectId of the MeasObjectNR in MeasConfig which is associated to the serving cell. For this MeasObjectNR, the following relationship applies between this MeasObjectNR and frequencyInfoDL in ServingCellConfigCommon of the serving cell; if ssbFrequency is configured, its value is the same as the absoluteFrequencySSB and if csi-rs-ResourceConfigMobility is configured, the value of its subcarrierSpacing is present in one entry of the scs-SpecificCarrierList, csi-RS-CellListMobility includes an entry corresponding to the serving cell (with cellId equal to physCellId in ServingCellConfigCommon) and the frequency range indicated by the csi-rs-MeasurementBW of the entry in csi-RS-CellListMobility is included in the frequency range indicated by in the entry of the scs-SpecificCarrierList.

In the second MO configuration method, a new MO for only CLI measurement may be used, or a new MO that may be generally applied to measure other signals except a downlink reference signal may be used. Examples of measuring other signals may include uplink delay measurement or the like. That is, a newly used measObject may be defined to also include other types of MOs or to perform a report differently than the existing one. A new type of report may be a type of report for transmitting log data. Also, when a new MO is used by applying the second MO configuration method, information about which serving cell the corresponding MO is associated with may be required. That is, additional information may be required about which cell the configured MO is synchronized with. This may be because it is necessary to configure how a reference SFN of the MO to be measured is defined and how synchronization is configured with another measurement frequency. For this purpose, the following methods may be used.

Second MO configuration method-1: A condition may be added such that it is always associated with a serving cell to which the corresponding configuration is applied also for a newly used MO (i.e., fields such as frequency and SCS may be set to be associated with a serving cell also for a new MO and a condition may be set such that the corresponding MO is associated with serving-CellMO)

Second MO configuration method-2: serving cell information (cell index or all cells with the same frequency synchronization) to which the corresponding MO is applied may be added in a newly used MO configuration. That is, when the corresponding CLI measurement configuration is included, the MO may be configured for each serving cell.

Also, as an additional consideration in association with the measurement object configuration, there may be how to ured in the MO with reference to the existing SRS configuration (SRS-Config). That is, index information (SRS-ResourceId) about an SRS resource (SRS-Resource) may be included or configuration information (e.g., SRS resource) for CLI measurement may be indicated through index information (SRS-ResourceSetId) about SRS-ResourceSet configured with an SRS resource set. For this purpose, when the base station provides SRS-Config in RRCReconfiguration, the SRS-ResourceSet configuration including SRS-Resource configuration or SRS-Resource configured for CLI measurement may include information indicating that a particular SRS resource (or a corresponding SRS resource included in the corresponding SRS resource set) is not a configuration for SRS transmission but a resource configuration for SRS measurement (CLI measurement). This information may be indicated through a 1-bit indicator (CLI measurement indicator). When there is no such indicator, it may be determined as configuration information for SRS transmission.

In both methods of adding the CLI measurement parameter described above, a plurality of pieces of SRS resource configuration information may be included in one MO, or a plurality of pieces of SRS resource configuration information may be included and configured in one or more pieces of SRS resource set information.

2. Measurement Report Configuration

In the measurement object configuration operation described above, when the MO for CLI measurement is configured, the terminal may measure a resource configured in the corresponding MO. In this case, it may be necessary to determine how to report the measurement result of the corresponding MO to the base station, and the report condition and method thereof may be included in the measurement report configuration. Also, the measurement report configuration may be configured in association with a particular MO (an MO configured with CLI measurement). Hereinafter, measurement report methods according to an embodiment of the disclosure will be described.

A. Periodical Report Configuration

A new reference signal type for CLI measurement in PeriodicalReportConfig may be defined. That is, the existing IE may be extended to use rsType-v16xy for SRS-RSRSP and CLI-RSSI, and a period thereof, the number of reports within the period, and the like may be included. Among the existing IE fields, reusable ones may be reused and only those requiring new configuration (e.g., rsType-v16xy) may be added. See an existing ASN.1 structure below.1.

```
PeriodicalReportConfig ::=   SEQUENCE {
    rsType                       NR-RS-Type,
    reportInterval               ReportInterval,
    reportAmount                 ENUMERATED {r1, r2, r4, r8, r16, r32, r64, infinity},
    reportQuantityCell           MeasReportQuantity,
    maxReportCells               INTEGER (1..maxCellReport),
    reportQuantityRS-Indexes     MeasReportQuantity              OPTIONAL,  -- Need R
    maxNrofRS-IndexesToReport    INTEGER (1..maxNrofIndexesToReport) OPTIONAL,  -- Need R
    includeBeamMeasurements      BOOLEAN,
    useWhiteCellList             BOOLEAN,
    ...
}
```

B. Event-Based Report Configuration: The Following Two Methods are Possible

First event-based report method: Use new event-based report for CLI measurement report New event (S1): When SRS-RSRP among measurement values associated with MO exceeds configured threshold:

The new event (S1) may have the same process as the existing A1 event; however, because the type of a reference signal to be measured may vary, a dedicated event for this may be used. See an existing A1 event below. That is, the new event (eventS1) may have the same parameters as the A1 event; however, the type and the range of a threshold of a reference signal applied to a1-Threshold may vary. That is, an existing MeasTriggerQuantity may be redefined and reused, or a new MeasTriggerQuantity may be defined and used for CLI measurement only. This may be because the range of the threshold of RSRP applied to the existing downlink CSI-RS and SSB and the range of the threshold of RSRP applied to the uplink SRS may be different. Also, a new mapping table and index for SRS-RSRP measurement and threshold mapping may be used.

```
eventA1            SEQUENCE {
    a1-Threshold        MeasTriggerQuantity,
    reportOnLeave       BOOLEAN,
    hysteresis          Hysteresis,
    timeToTrigger       TimeToTrigger
},
```

Also, for the new event (S1), when a plurality of SRS resources are configured, the following event-based SRS resource measurement report method may be considered according to the number of times and method of reporting the same.

i) First method of reporting a plurality of SRSs: Method of reporting based on the measurement value of each configured SRS resource:

When at least one of the SRS resources configured in the MO exceeds a threshold value to trigger a measurement report, the measurement values of all SRS resources included in the MO may be included and reported or only the measurement value of the SRS resource triggering the corresponding event may be included and reported.

ii) Second method of reporting a plurality of SRSs: Method of reporting based on the average value of all configured SRS resources:

When the average of the measurement values of the SRS resources configured in the MO exceeds a threshold value to trigger a measurement report, the measurement values of all SRS resources included in the MO may be included and reported or only the measurement value of the SRS resource triggering the corresponding event may be included and reported.

Also, a 1-bit indicator for selecting the first method of reporting a plurality of SRSs and the second method of reporting a plurality of SRSs may also be used.

New event (S2): When SRS-RSRP among measurement values associated with MO is smaller than configured threshold:

As in the new event (S1) described above, in the case of the new event (S2), the new event (S2) (see the existing A2 event process) may be generated and the content described in the new event (S1) may be applied as is. However, according to an embodiment of the disclosure, the new event (S2) may not be used and a reportOnLeave function may be added to the new event (S1) described above. In this case, when the condition of the new event (S1) is satisfied and thereafter the condition of the new event (S1) is not satisfied, the new event (S2) may be replaced by re-performing a report on the new event (S1). This may be because when the measured SRS-RSRP value is smaller than a certain threshold, the measurement value of the terminal reporting the same may not be very important information from the viewpoint of the base station. Also, when the new event (S2) is used, a load on the terminal may increase due to a frequent measurement report.

Second event-based report method: Extend existing event-based report process to apply to CLI measurement report Existing event (A1) reuse: When the process applied to the existing event (A1) may be applied as is to the CLI measurement report, reusing the existing A1 event process may be advantageous in terms of signal processing. As illustrated in the ASN.1 example for the A1 event described above, the existing parameter may be applied as is to the CLI measurement and event report. For this purpose, it may be necessary to determine whether SRS-RSRP is applicable to triggerQuantity (MeasTriggerQuantity). When the existing parameter is applicable to the CLI measurement and event report, when the CLI measurement value is configured, the RSRP mapping value in MeasTriggerQuantity should be applicable to SRS-RSRP. As described above, because the range of the parameter configured based on a downlink reference signal and the range of the parameter to be configured based on an uplink SRS signal may be different, when the corresponding ranges are different, the first event-based report method may be applied.

The event A2 reuse problem may be considered in the CLI measurement and event report. In this case, the event A1 reuse method described above may be applied even in the case of below a threshold value. However, as described above, the event A2 may not be used and the reportOnLeave function may be added to the A1 event described above. In this case, when the condition of the event A1 is satisfied and thereafter the condition of the event A1 is not satisfied, the event A2 may be replaced by re-performing a report on the A1 event. This may be because when the measured SRS-RSRP value is smaller than a certain threshold, the measurement value of the terminal reporting the same may not be very important information from the viewpoint of the base station. Also, when the event A2 is used, a load on the terminal may increase due to a frequent measurement report.

Upon receiving the measurement configuration information described above, the terminal 1 1*f*-01 may transmit a confirmation message indicating that the configuration information has been successfully received, to the base station 1*f*-02 (1*f*-20). For this purpose, an RRCReconfigurationComplete message may be used. In operation 1*f*-25, the terminal 1 1*f*-01 may perform data communication with the base station 1*f*-02. Also, in operation 1*f*-30, the terminal 1 1*f*-01 may start measurement of the measurement resources of measurement objects (1*f*-31, 1*f*-32, 1*f*-33, 1*f*-34, 1*f*-35) including the CLI measurement and the serving cell configured in operation 1*f*-20. In operation 1*f*-25, the terminal 1 1*f*-01 may measure the cell-level measurement result for the MO configured with a downlink reference signal, measure the configured SRS-RSRP and CLI-RSSI signal for the MO associated with the CLI measurement, and determine the report condition configured from the base station 1*f*-02. The report condition configured from the base station 1*f*-02 may be configured differently according to the intra-frequency/inter-frequency. Particularly, in the case of an inter-frequency channel measurement configuration, carrier frequency information indicating the corresponding frequency may be required. In operation 1*f*-35, the terminal 1 1*f*-01 may trigger the measurement report process according to the configured measurement report condition. In this case, the measurement report may include a periodical report and an event-based report. A detailed report configuration may follow the report configuration described in operation 1*f*-15 of FIG. 6. In operation 1*f*-40, the terminal 1 1*f*-01 may report the measurement result to the base station through an RRC message. This report message may include the serving cell and surrounding cell measurement value and the CLI measurement value. That is, both the serving cell and surrounding cell measurement value and the CLI measurement value may be included in the report message, or each measurement value may be included therein.

Referring to FIG. 6, at operation 1*f*-40, when the terminal 1 1*f*-01 performs an event-based report, the report message may include the measurement values of all SRS resources included in the MO or may include only the measurement value of the SRS resource triggering the corresponding event. The value used for the measurement report may be an actual measurement value or an average value of the configured SRS resources. Also, the measurement report may not include the measurement value of the serving cell defined in the existing NR system. In the NR system, the terminal is set to always report the measurement value of the serving cell. Because the SRS measurement and report is not significantly related to the serving cell measurement value, it may be ignored even when the base station receives the serving cell measurement value (in the case of the terminal, a certain value may be included and reported in the serving cell measurement value). In this case, ReportConfigNR-CLI that is a new report configuration may be used instead of the existing ReportConfigNR. Alternatively, when the CLI measurement value is reported, it may be restricted to always report the measurement value of the serving cell as well.

Thereafter, in operation 1*f*-45, the base station 1*f*-02 may analyze the measurement value based on the measurement value received from the terminal 1 1*f*-01 and apply the analysis result to the network operation. For example, the analysis result may be applied to a handover process and dynamic TDD scheduling.

Figure 7:
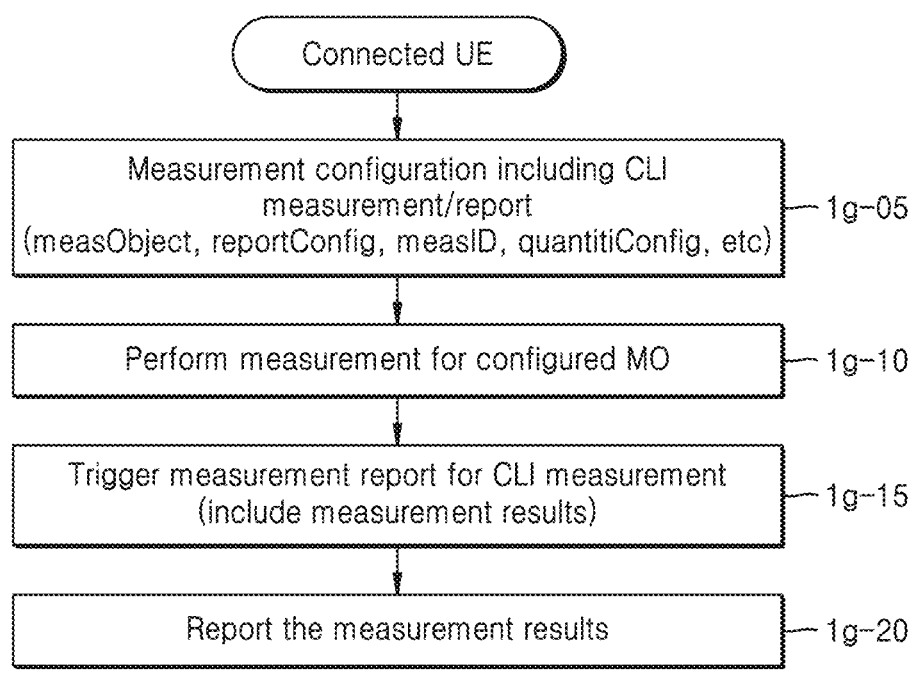
FIG. 7 is a diagram illustrating a method, performed by a terminal, of measuring and reporting on a cross-interference link according to an embodiment of the disclosure.

FIG. 7 is a diagram illustrating a method, performed by a terminal, of measuring and reporting on a cross interference link according to an embodiment of the disclosure.

FIG. 6 illustrates an entire process of measuring and reporting on a cross interference link from the viewpoint of the system, and FIG. 7 illustrates an operation from the viewpoint of the terminal.

In operation 1*g*-05, the terminal in a connection state may receive a measurement configuration from the base station. The measurement configuration may include measObject, reportConfig, measID, quantityConfig, and/or the like. Particularly, the MO configuration may be to configure which signal should be measured on which resource. The MO configuration may be configured to use CSI-RS and SSB, which are the types of the existing downlink reference signals, as measurement objects, and may also include measurement information for CLI including SRS-RSRP and CLI-RSSI. The MO configuration for CLI may consider the following matters, and detailed information and descriptions thereof will refer to FIG. 6.

Use existing MO or use new MO for CLI measurement

How to include SRS resource configuration information for CLI (Listing all in MO or including SRS resource configuration index to be measured)

How to associate configured MO with serving cell

Also, the measurement configuration received in operation 1*g*-05 may additionally include a report configuration, and particularly, may include a report condition associated with the MO for CLI. In the disclosure, an event-based report will be mainly described and detailed information and descriptions thereof will refer to FIG. 6.

Define event for the case where SRS-RSRP measurement value exceeds threshold value: Reuse existing A1 event or use new S1 event Number of times and method of reporting when multiple SRS resources are configured How to report only measurement value for SRS resource that triggered the event or report all measurement values for the entire configured SRS resources How the measurement value follows the actual SRS-RSRP value or how to use the measurement average value of the configured SRS resources How to use a different range of threshold values than the threshold values used for existing RS measurement and event triggering (SRS only), and how to use a new CLI measurement report configuration accordingly.

In operation 1g-10, the terminal may perform measurement on the configured MO according to the measurement configuration received in operation 1g-05. In operation 1g-10, when there is the MO configuration associated with the CLI, the terminal may measure the SRS resource configured in the corresponding MO, and in this case, may perform measurement on the time-frequency resource in the activated downlink BWP.

In operation 1g-15, the terminal may determine a report condition for the measured CLI measurement and prepare for reporting by including the measured value in the measurement result when the report condition is satisfied. Both the periodical report and the event-based report may be possible according to the measurement report conditions, and in the case of an event report, when the measured value based on SRS-RSRP exceeds a threshold value, the report process may be triggered by reusing an A1 event or by using a new S1 event.

In operation 1g-20, the measurement result that is the measurement value generated in operation 1g-15 may be included in an RRC message and transmitted to the base station. Thereafter, the terminal may perform a handover or a resource reconfiguration according to an RRCReconfiguration message transmitted by the base station.

Figure 8:
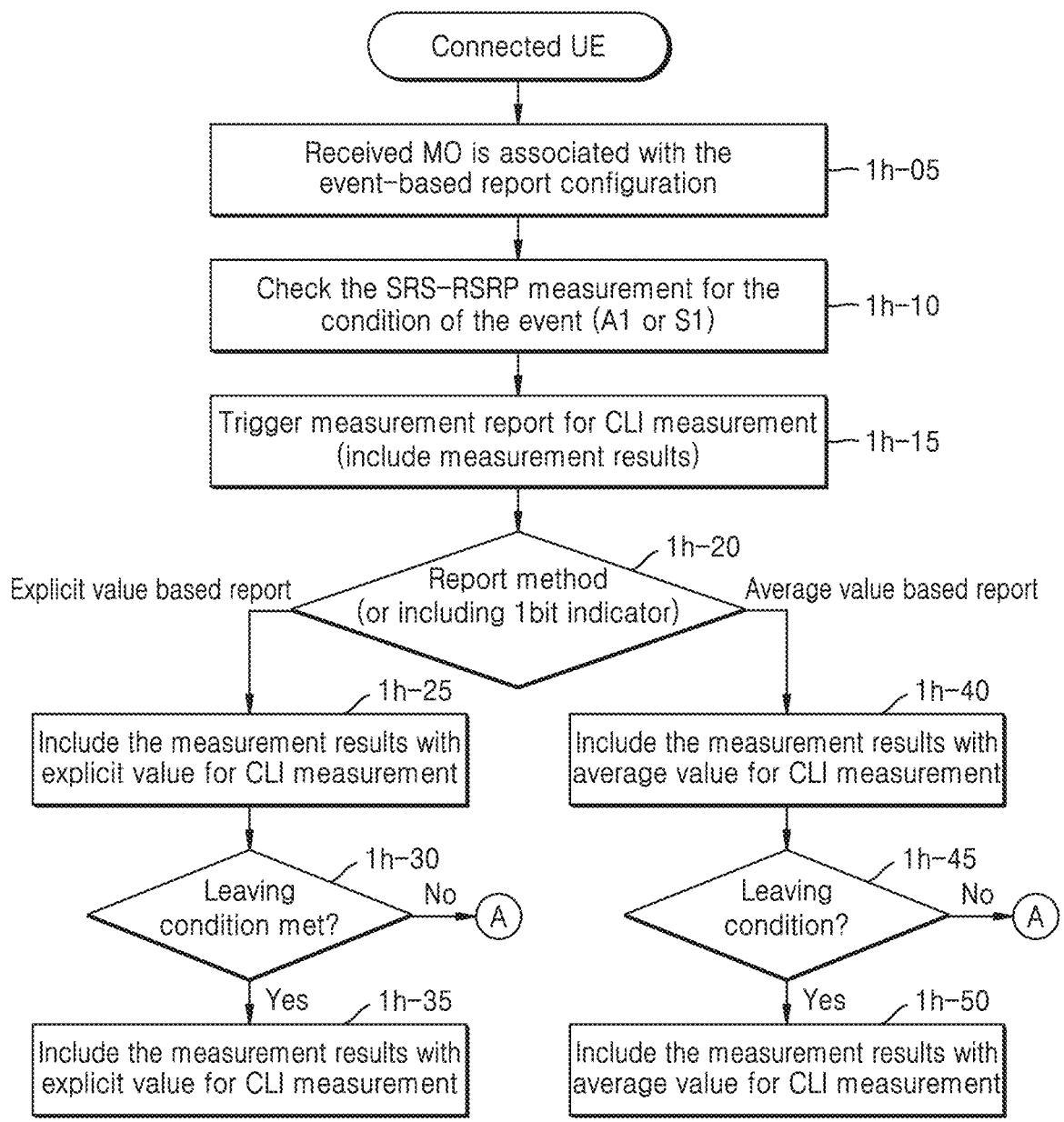
FIG. 8 is a diagram illustrating an operating method of a terminal when an event-based measurement report is configured for a cross-interference link according to an embodiment of the disclosure.

FIG. 8 is a diagram illustrating an operating method of a terminal when an event-based measurement report is configured for a cross interference link, according to an embodiment of the disclosure.

In operation 1h-05, the terminal may receive an event-based measurement report configuration associated with the MO including configuration information for CLI measurement. The event-based measurement report configuration associated with the MO may be received by being included in measurement configuration information in an RRCReconfiguration message. Detailed descriptions related to the configuration information will refer to the description of operation 1f-15 of FIG. 6. FIG. 8 is a diagram illustrating a case where an event-based measurement report is configured for the MO for CLI measurement. In operation 1h-10, the terminal may trigger an event-based report process according to whether the measurement value (SRS-RSRP) for the SRS resource in the configured CLI measurement MO exceeds a threshold value. The event-based report process may operate as in the existing A1 event, and the threshold value applied in this case may be reused as a value defined in the existing A1 event or redefined as a value having a new range. This may be because the RSRP ranges of an uplink reference signal and a downlink reference signal may be applied differently. When a new RSRP range is used, it may be redefined as a range for SRS-RSRP measurement and may be applied only to CLI measurement, particularly only to SRS-RSRP mapping. Also, a new event (e.g., S1) may be introduced instead of reusing the A1 event, and the process of A1 may be applied as is as the entire process. Particularly, because the ReportOnLeave configuration and operation may be introduced as is, the introduction of the A2 event (or S2 event) may be omitted. The A2 and S2 events may be triggered when the measured SRS-RSRP value decreases below a threshold value, and in an embodiment of the disclosure, the A2 and S2 events may be used but similar functions may replace the A1 (S1) event and ReportOnLeave.

In operation 1h-15, when the CLI measurement result satisfies a particular event condition according to the measurement result in operation 1h-10, the terminal may trigger the measurement report process thereof and store the measurement value thereof. In operation 1h-20, the terminal may operate differently depending on which report method is configured for the terminal. That is, when a plurality of SRS resource configurations are included in the MO configured for CLI measurement (SRS resource information to be measured is explicitly included or an SRS resource index to be measured is included), the terminal may use the measurement value applied to event triggering as a value based on an actual measurement value or an average measurement value. When it is configured to report based on the actual measured SRS-RSRP, the terminal may proceed to operation 1h-25 and include the actually-measured CLI measurement values in the measurement result. In this case, it may include only measurement information for the SRS resource that triggered the corresponding event or may include measurement information for all SRS resources included in the configured MO. Also, the measurement information may basically include an SRS-RSRP value and may also include a CLI-RSSI value. In operation 1h-30, when the leaving condition for the corresponding event is satisfied, the terminal may re-perform a report on the corresponding event (1h-35). The following are the entering condition and the leaving condition for the A1 event, and these conditions may be applied as is to the corresponding event. When the leaving condition is not satisfied in operation 1h-30, a separate operation may not be performed.

Inequality $A1-1$ (Entering condition)

$$Ms - Hys > Thresh$$

Inequality $A1-2$ (Leaving condition)

$$Ms + Hys < Thresh$$

When a plurality of SRS resource configurations are included in the MO configured for CLI measurement in operation 1h-20 (SRS resource information to be measured is explicitly included or an SRS resource index to be measured is included), the terminal may use the measurement value applied to event triggering as a value based on an average measurement value, not based on an actual measurement value. When this configuration is applied, the terminal may proceed to operation 1h-40 and include the average value of the measurement values in the measurement result instead of including the measurement values for the actually-measured CLI measurement values. Also in this case, it may include only measurement information for the SRS resource that triggered the corresponding event or may include measurement information for all SRS resources included in the configured MO. Also, the measurement information may basically include an SRS-RSRP value and may also include a CLI-RSSI value. In operation 1h-45, when the leaving condition for the corresponding event is satisfied, the terminal may re-perform a report on the corresponding event (1h-50). The following are the entering condition and the leaving condition for the A1 event, and these conditions may be applied as is to the corresponding event. When the leaving condition is not satisfied in operation 1h-45, a separate operation may not be performed.

Inequality $A1-1$ (Entering condition)

$$Ms - Hys > Thresh$$

-continued

Inequality A1-2 (Leaving condition)

$$Ms + Hys < Thresh$$

Figure 9:
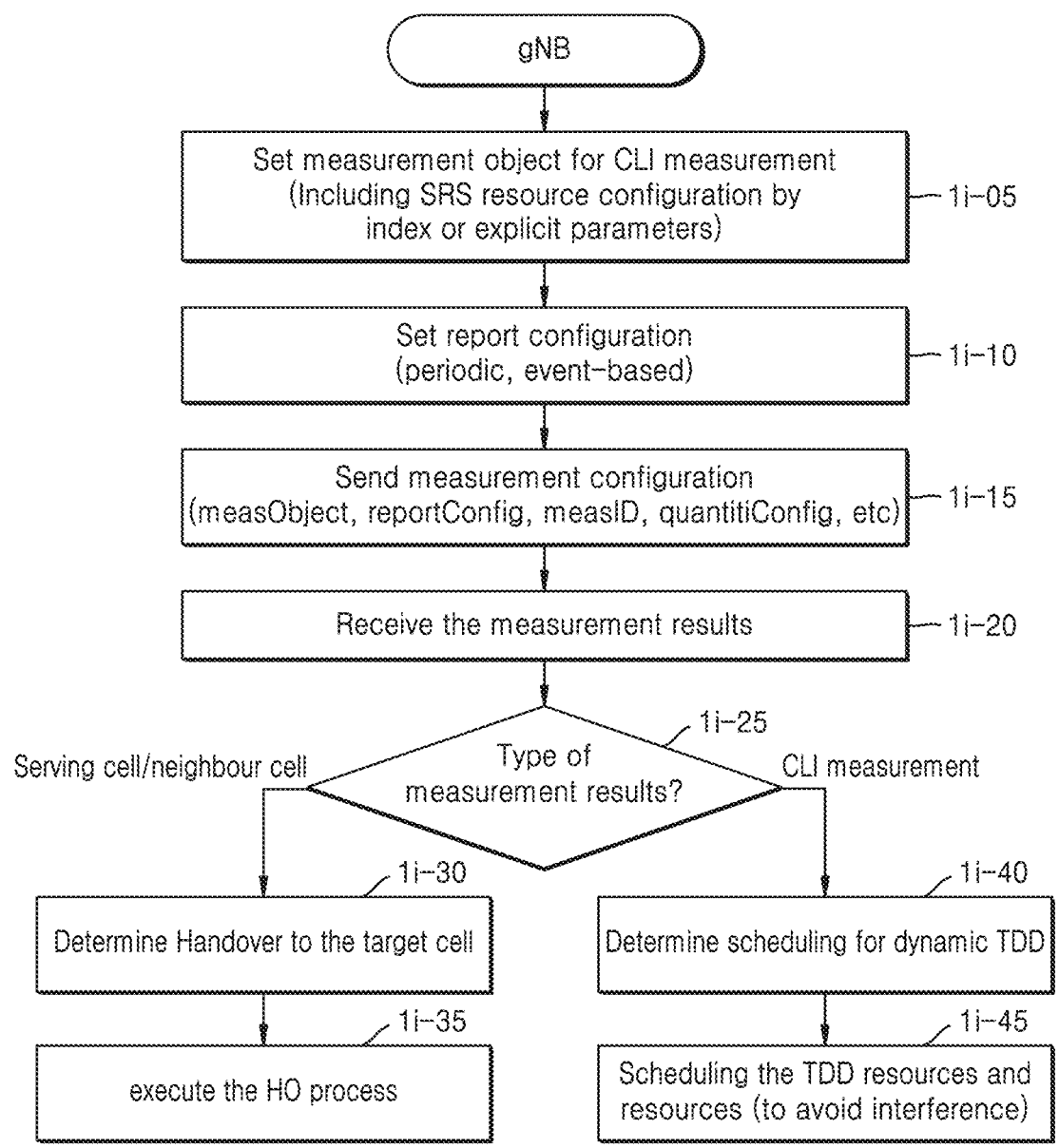
FIG. 9 is a diagram illustrating a method, performed by a base station, of measuring and reporting on a cross-interference link according to an embodiment of the disclosure.

FIG. 9 is a diagram illustrating a method, performed by a base station, of measuring and reporting on a cross interference link according to an embodiment of the disclosure.

FIG. 9 includes the content that the base station generates and transmits the measurement configuration for CLI measurement to the terminal, and detailed descriptions thereof will refer to the related description of FIG. 6.

When there is an RRC-connected terminal, the base station may provide measurement configuration information to the terminal through RRC configuration and apply the same to the subsequent terminal mobility and scheduling. In the disclosure, portions related to CLI measurement will be described in detail, and in FIG. 9, general technology will be omitted and only the CLI measurement portions will be described.

In operation 1i-05, the base station may generate measurement configuration information for CLI measurement, and an MO configuration including SRS resource configuration may be included in the configuration information. The MO configuration in operation 1i-05 may use an existing measObjectNR as is or may introduce a new MO (measObjectNR-CLI) and include only a CLI dedicated configuration. As for this MO configuration, it will refer to the description of operation 1f-15 of FIG. 6.

Thereafter, in operation 1i-10, the base station may generate configuration information for reporting in the measurement configuration information for CLI measurement. In this case, a periodical report and an event-based measurement report may be configured separately, and the configuration information for reporting may include parameters related to conditions and methods required for reporting. As for this configuration information for reporting, it will refer to the description of operation 1f-15 of FIG. 6.

The base station may store the measurement configuration information configured in operations 1i-05 and 1i-10 and transmit configuration information for CLI measurement and report to the terminal through an RRCReconfiguration message (in operation 1i-15). In this case, a measurement configuration process in the NR system may be applied, and the terminal receiving the same may perform CLI measurement and report according to the information transmitted by the base station. In operation 1i-20, the base station may receive a measurement result included in the measurement report transmitted by the terminal. The measurement result may include a CLI measurement result according to the report condition associated with the MO related to the configured CLI measurement. In operation 1i-25, when the received measurement report is the measurement result of the serving cell and the surrounding cell associated with the existing downlink reception signal, the base station may proceed to operation 1i-30 and determine a handover based on the received measurement value. Also, in operation 1i-35, the base station may perform a handover process.

However, in operation 1i-25, when the received measurement report is the measurement result associated with the CLI measurement value, the base station may proceed to operation 1i-40 and determine to dynamically allocate the TDD resource based on the measurement result. Also, in operation 1i-45, the base station may directly perform dynamic TDD scheduling or perform scheduling within the existing resource for reducing the interference. In this case, performing dynamic TDD resource scheduling may mean that the corresponding resource is not changed from the TDD resource to the uplink transmission when the cross link interference is determined to be significant in the corresponding DL measurement resource as a result of the CLI measurement from the terminal. Also, as for the resource with a small interference, it may be changed to the uplink transmission resource time.

Figure 10:
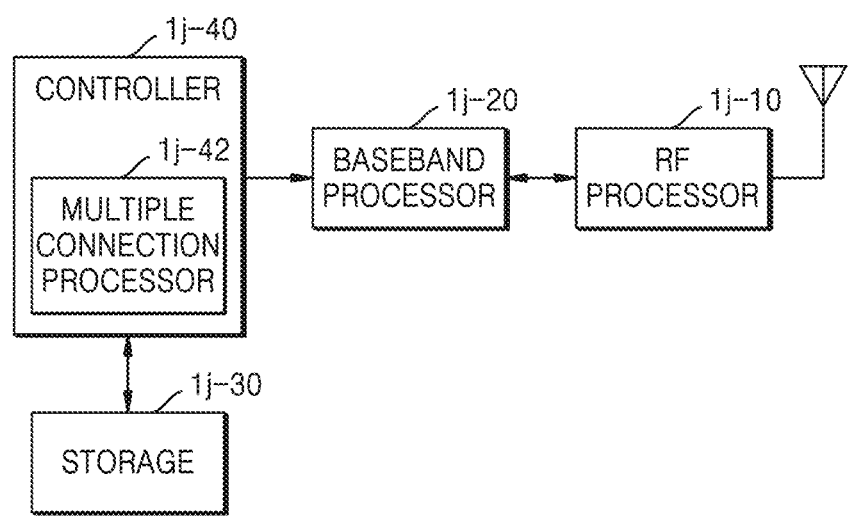
FIG. 10 is a block diagram illustrating an internal structure of a terminal according to an embodiment of the disclosure.

FIG. 10 is a block diagram illustrating an internal structure of a terminal according to an embodiment of the disclosure.

Referring to FIG. 10, the terminal may include a radio frequency (RF) processor 1j-10, a baseband processor 1j-20, a storage 1j-30, and a controller 1j-40. The controller 1j-40 may include a multiple connection processor 1j-42.

The RF processor 1j-10 may perform functions for transmitting/receiving signals on wireless channels, such as band conversion and amplification of signals. That is, the RF processor 1j-10 may up-convert a baseband signal provided from the baseband processor 1j-20 into an RF band signal and transmit the same through an antenna and may down-convert an RF band signal received through the antenna into a baseband signal. For example, the RF processor 1j-10 may include a transmission filter, a reception filter, an amplifier, a mixer, an oscillator, a digital-to-analog converter (DAC), and an analog-to-digital converter (ADC). Although only one antenna is illustrated in the drawings, the terminal may include a plurality of antennas. Also, the RF processor 1j-10 may include a plurality of RF chains. In addition, the RF processor 1j-10 may perform beamforming. For beamforming, the RF processor 1j-10 may adjust the phase and magnitude of each of the signals transmitted or received through a plurality of antennas or antenna elements. Also, the RF processor may perform multiple-input and multiple-output (MIMO) and may receive multiple layers when performing a MIMO operation.

The baseband processor 1j-20 may perform a conversion function between a baseband signal and a bitstream according to the physical layer standard of the system. For example, during data transmission, the baseband processor 1j-20 may generate complex symbols by encoding and modulating a transmission bitstream. Also, during data reception, the baseband processor 1j-20 may restore a reception bitstream by demodulating and decoding the baseband signal provided from the RF processor 1j-10. For example, according to an OFDM scheme, during data transmission, the baseband processor 1j-20 may generate complex symbols by encoding and modulating a transmission bitstream, map the complex symbols to subcarriers, and then configure OFDM symbols through an inverse fast Fourier transform (IFFT) operation and cyclic prefix (CP) insertion. Also, during data reception, the baseband processor 1j-20 may divide a baseband signal provided from the RF processor 1j-10 into OFDM symbol units, restore signals mapped to the subcarriers through a fast Fourier transform (FFT) operation, and then restore a reception bitstream through demodulation and decoding.

The baseband processor 1j-20 and the RF processor 1j-10 may transmit and receive signals as described above. Accordingly, the baseband processor 1j-20 and the RF processor 1j-10 may be referred to as a transmitter, a receiver, a transceiver, or a communicator. In addition, at least one of the baseband processor 1j-20 or the RF processor 1j-10 may include a plurality of communication modules to support a plurality of different radio access technologies. Also, at least one of the baseband processor 1j-20 or the RF processor 1j-10 may include a plurality of communication modules to process signals of different frequency bands. For example, the different wireless access technologies may include wireless LAN (e.g., IEEE 802.11) and cellular network (e.g., LTE). Also, the different frequency bands may include a super high frequency (SHF) (e.g., 2.5 GHz or 5 GHz) band and a millimeter wave (e.g., 60 GHz) band.

The storage $1j$-30 may store data such as a basic program, an application program, or configuration information for an operation of the terminal. Particularly, the storage $1j$-30 may store information related to a second access node performing wireless communication by using a second radio access technology. Also, the storage $1j$-30 may provide the stored data at the request of the controller $1j$-40.

The controller $1j$-40 may control overall operations of the terminal. For example, the controller $1j$-40 may transmit/receive signals through the baseband processor $1j$-20 and the RF processor $1j$-10. Also, the controller $1j$-40 may write/read data into/from the storage $1j$-30. For this purpose, the controller $1j$-40 may include at least one processor. For example, the controller $1j$-40 may include a communication processor (CP) for performing control for communication and an application processor (AP) for controlling an upper layer such as an application program.

Figure 11:
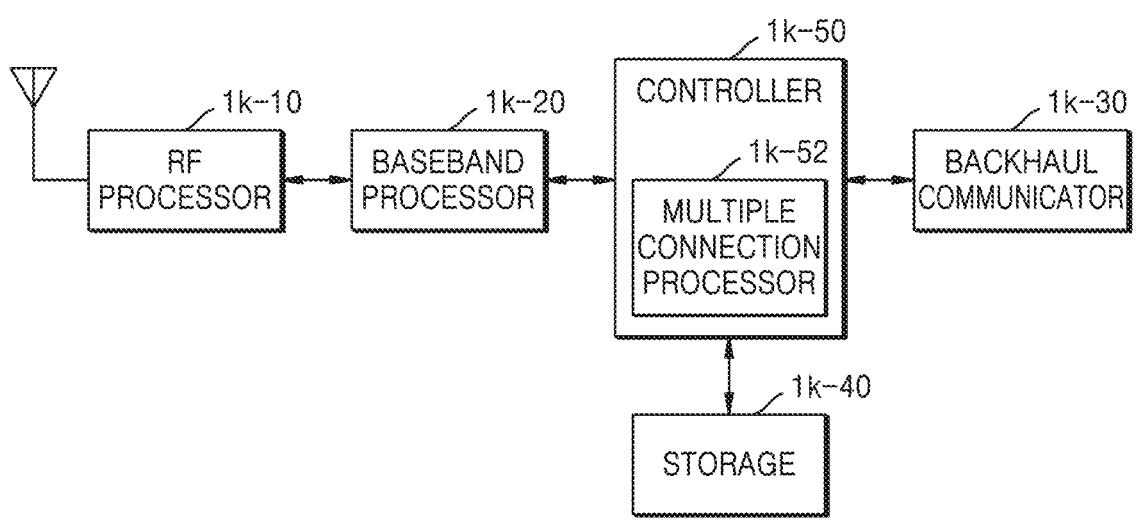
FIG. 11 is a block diagram illustrating a configuration of a base station according to an embodiment of the disclosure.

FIG. 11 is a block diagram illustrating a configuration of a base station according to an embodiment of the disclosure.

As illustrated in FIG. 11, the base station may include an RF processor $1k$-10, a baseband processor $1k$-20, a backhaul communicator $1k$-30, a storage $1k$-40, and a controller $1k$-50. The controller $1k$-50 may include a multiple connection processor $1k$-52.

The RF processor $1k$-10 may perform functions for transmitting/receiving signals on wireless channels, such as band conversion and amplification of signals. That is, the RF processor $1k$-10 may up-convert a baseband signal provided from the baseband processor $1k$-20 into an RF band signal and transmit the same through an antenna and may down-convert an RF band signal received through the antenna into a baseband signal. For example, the RF processor $1k$-10 may include a transmission filter, a reception filter, an amplifier, a mixer, an oscillator, a DAC, and an ADC. Although only one antenna is illustrated in the drawings, a first access node may include a plurality of antennas. Also, the RF processor $1k$-10 may include a plurality of RF chains. In addition, the RF processor $1k$-10 may perform beamforming. For beamforming, the RF processor $1k$-10 may adjust the phase and magnitude of each of the signals transmitted/received through a plurality of antennas or antenna elements. The RF processor may perform a downlink MIMO operation by transmitting one or more layers.

The baseband processor $1k$-20 may perform a conversion function between a baseband signal and a bitstream according to the physical layer standard of a first radio access technology. For example, during data transmission, the baseband processor $1k$-20 may generate complex symbols by encoding and modulating a transmission bitstream. Also, during data reception, the baseband processor $1k$-20 may restore a reception bitstream by demodulating and decoding the baseband signal provided from the RF processor $1k$-10. For example, according to the OFDM scheme, during data transmission, the baseband processor $1k$-20 may generate complex symbols by encoding and modulating a transmission bitstream, map the complex symbols to subcarriers, and then configure OFDM symbols through an IFFT operation and CP insertion. Also, during data reception, the baseband processor $1k$-20 may divide a baseband signal provided from the RF processor $1k$-10 into OFDM symbol units, restore signals mapped to the subcarriers through an FFT operation, and then restore a reception bitstream through demodulation and decoding. The baseband processor $1k$-20 and the RF processor $1k$-10 may transmit and receive signals as described above. Accordingly, the baseband processor $1k$-20 and the RF processor $1k$-10 may be referred to as a transmitter, a receiver, a transceiver, a communicator, or a wireless communicator.

The backhaul communicator $1k$-30 may provide an interface for communicating with other nodes in the network. That is, the backhaul communicator $1k$-30 may convert a bitstream transmitted from a main base station to another node, for example, an auxiliary base station, a core network, or the like, into a physical signal and may convert a physical signal received from another node into a bitstream.

The storage $1k$-40 may store data such as a basic program, an application program, or configuration information for an operation of the main base station. Particularly, the storage $1k$-40 may store information about a bearer allocated to a connected terminal, a measurement result reported from the connected terminal, or the like. Also, the storage $1k$-40 may store information that is a reference for determining whether to provide or terminate a multiple connection to the terminal. Also, the storage $1k$-40 may provide the stored data at the request of the controller $1k$-50.

The controller $1k$-50 may controls overall operations of the main base station. For example, the controller $1k$-50 may transmit/receive signals through the baseband processor $1k$-20 and the RF processor $1k$-10 or through the backhaul communicator $1k$-30. Also, the controller $1k$-50 may write/read data into/from the storage $1k$-40. For this purpose, the controller $1k$-50 may include at least one processor.

The methods according to the embodiments of the disclosure described in the specification or the claims may be implemented by hardware, software, or a combination thereof.

When the methods are implemented by software, a computer-readable storage medium or a computer program product may be provided to store one or more programs (software modules). The one or more programs stored in the computer-readable storage medium or the computer program product may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Alternatively, the programs may be stored in a memory configured by a combination of some or all of such storage devices. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured by any combination thereof. Such a storage device may be connected through an external port to an apparatus performing an embodiment of the disclosure. Also, a separate storage device on a communication network may be connected to an apparatus performing an embodiment of the disclosure.

In the above particular embodiments of the disclosure, the components included in the disclosure are expressed in the singular or plural according to the presented particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of measuring and reporting cross link interference (CLI) by a user equipment (UE) in a wireless communication system, the method comprising:
   receiving, from a base station, a measurement configuration including a CLI measurement object;
   performing measurement on at least one CLI measurement resource of the CLI measurement object;
   identifying a first measurement value for a CLI measurement resource among the at least one CLI measurement resource; and
   in case that event-based CLI measurement reporting is configured and a triggering condition associated with exceeding a threshold is fulfilled for the CLI measurement resource based on the first measurement value, transmitting, to the base station, a measurement report for the CLI measurement resource among the at least one CLI measurement resource.

2. The method of claim 1, wherein the threshold is a value associated with the at least one CLI measurement resource.

3. The method of claim 1, further comprising:
   identifying a second measurement value for the CLI measurement resource among the at least one CLI measurement resource; and
   in case that the event-based CLI measurement reporting is configured and a leaving condition associated with being below the threshold is fulfilled for the CLI measurement resource based on the second measurement value, transmitting a measurement report for the CLI measurement resource.

4. The method of claim 3, further comprising:
   identifying that the triggering condition is fulfilled based on the first measurement value minus a hysteresis exceeding the threshold; and
   identifying that the leaving condition is fulfilled based on the second measurement value plus the hysteresis being below the threshold.

5. The method of claim 1, wherein the performing of the measurement comprises:
   performing the measurement on all of the at least one CLI measurement resource of the CLI measurement object.

6. The method of claim 1, wherein the at least one CLI measurement resource comprises at least one of a sounding reference signal (SRS) resource or a resource for measuring cross link interference-received signal strength indication (CLI-RSSI).

7. The method of claim 1, wherein the measurement report comprises at least one of a sounding reference signal-reference signal received power (SRS-RSRP) or cross link interference-received signal strength indication (CLI-RSSI).

8. The method of claim 1, wherein the transmitting of the measurement report comprises:
   transmitting, to the base station, the measurement report of a serving cell of the UE.

9. A user equipment (UE) measuring and reporting cross link interference (CLI) in a wireless communication system, the UE comprising:
   a transceiver; and
   at least one processor configured to:
      receive, from a base station, a measurement configuration including a CLI measurement object,
      perform measurement on at least one CLI measurement resource of the CLI measurement object,
      identify a first measurement value for a CLI measurement resource among the at least one CLI measurement resource, and
      control the transceiver to, in case that event-based CLI measurement reporting is configured and a triggering condition associated with exceeding a threshold is fulfilled for the CLI measurement resource based on the first measurement value, transmit, to the base station, a measurement report for the CLI measurement resource among the at least one CLI measurement resource.

10. The UE of claim 9, wherein the threshold is a value associated with the at least one CLI measurement resource.

11. The UE of claim 9, wherein the at least one processor is further configured to:
   identify a second measurement value for the CLI measurement resource among the at least one CLI measurement resource, and
   control the transceiver to, in case the event-based CLI measurement reporting is configured and a leaving condition associated with being below the threshold is fulfilled for the CLI measurement resource based on the second measurement value, transmit a measurement report for the CLI measurement resource.

12. The UE of claim 11, wherein the at least one processor is further configured to:
   identify that the triggering condition is fulfilled based on the first measurement value minus a hysteresis exceeding the threshold, and
   identify that the leaving condition is fulfilled based on the second measurement value plus the hysteresis being below the threshold.

13. The UE of claim 10, wherein the at least one processor is further configured to:
   perform the measurement on all of the at least one CLI measurement resource of the CLI measurement object.

14. The UE of claim 9, wherein the at least one CLI measurement resource comprises at least one of a sounding reference signal (SRS) resource or a resource for measuring cross link interface-received signal strength indication (CLI-RSSI).

15. The UE of claim 9, wherein the measurement report comprises at least one of a sounding reference signal-reference signal received power (SRS-RSRP) or cross link interference-received signal strength indication (CLI-RSSI).

16. The UE of claim 9, wherein the at least one processor is further configured to:
   control the transceiver to transmit, to the base station, the measurement report of a serving cell of the UE.

* * * * *